United States Patent
Goldberg

(10) Patent No.: US 10,970,193 B2
(45) Date of Patent: *Apr. 6, 2021

(54) DEBUGGING A CLIENT SYNCHRONIZATION SERVICE

(71) Applicant: Dropbox, Inc., San Francisco, CA (US)

(72) Inventor: Isaac Goldberg, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 442 days.

This patent is subject to a terminal disclaimer.

(21) Appl. No.: 15/987,151

(22) Filed: May 23, 2018

(65) Prior Publication Data

US 2019/0361793 A1 Nov. 28, 2019

(51) Int. Cl.
*G06F 11/36* (2006.01)
*G06F 16/178* (2019.01)

(52) U.S. Cl.
CPC ........ *G06F 11/3632* (2013.01); *G06F 16/178* (2019.01)

(58) Field of Classification Search
CPC . G06F 11/3632; G06F 11/3664; G06F 16/178
See application file for complete search history.

(56) References Cited

U.S. PATENT DOCUMENTS

| | | | |
|---|---|---|---|
| 6,850,967 B1 | 2/2005 | Spencer et al. | |
| 7,395,281 B2 | 7/2008 | Edwards | |
| 7,712,081 B2 | 5/2010 | Biberstein et al. | |
| 7,958,497 B1 | 6/2011 | Lindo et al. | |
| 8,260,742 B2 | 9/2012 | Cognigni et al. | |
| 8,312,051 B2 | 11/2012 | Jiang et al. | |
| 8,326,816 B2 | 12/2012 | Colle et al. | |
| 8,572,022 B2 | 10/2013 | Hagan et al. | |
| 8,707,272 B2 | 4/2014 | Ganai | |
| 8,775,682 B1 | 7/2014 | Mathias et al. | |
| 8,813,042 B2 | 8/2014 | Chakrabarti | |
| 8,832,659 B2 | 9/2014 | Ceze et al. | |
| 9,286,162 B2 | 3/2016 | Obusek | |
| 9,374,275 B2 | 6/2016 | Wen et al. | |
| 9,396,245 B2 | 7/2016 | MacKenzie et al. | |
| 9,448,893 B1 | 9/2016 | Whitehead et al. | |
| 9,501,762 B2 | 11/2016 | Babenko et al. | |
| 9,594,647 B2 | 3/2017 | Meaney et al. | |
| 9,805,106 B2 | 10/2017 | McErlean et al. | |
| 10,552,138 B2 | 2/2020 | Smith et al. | |
| 2008/0201629 A1 | 8/2008 | Duesterwald et al. | |

(Continued)

OTHER PUBLICATIONS

Non-Final Office Action from U.S. Appl. No. 15/987,107, dated Feb. 20, 2020, 13 pages.

(Continued)

*Primary Examiner* — Scott A. Waldron
(74) *Attorney, Agent, or Firm* — Polsinelli PC

(57) ABSTRACT

The disclosed technology relates to a system configured to generate an initial tree state, wherein the initial tree state includes three tree data structures configured to aid in the synchronization of content items managed by a content management system. The system is configured to provide the initial tree state to a client synchronization service, retrieve a final tree state from the client synchronization service, and determine whether the final tree state is correctly synchronized.

20 Claims, 17 Drawing Sheets

(56) References Cited

U.S. PATENT DOCUMENTS

| | | |
|---|---|---|
| 2011/0167412 A1 | 7/2011 | Kahlon et al. |
| 2012/0016621 A1 | 1/2012 | Tan et al. |
| 2013/0268491 A1 | 10/2013 | Chung et al. |
| 2014/0195485 A1 | 7/2014 | Dorman |
| 2015/0363306 A1 | 12/2015 | Wu et al. |
| 2016/0132417 A1 | 5/2016 | Grosser et al. |
| 2016/0182494 A1* | 6/2016 | Lissounov .......... H04L 67/1095 726/10 |
| 2017/0116220 A1 | 4/2017 | Wong et al. |

OTHER PUBLICATIONS

Notice of Allowance from U.S. Appl. No. 15/987,107, dated May 21, 2020, 6 pages.

* cited by examiner

DEBUGGING A CLIENT SYNCHRONIZATION SERVICE

BACKGROUND

Content management systems allow users to access and manage content items across multiple devices using a network. Some content management systems may allow users to share content items and provide additional features that aid users in collaborating using the content items. Content management systems generally store content items on servers and allow users access to the content items over a network. Some content management systems also allow for local copies to be stored on a client device in order to provide users with faster access to content items in a more natural interface (e.g., a native application or within the file system of the client device). Additionally, this allows the user to have access to the content items when the user is offline. Content management systems attempt to synchronize copies of a content item across a number of client devices and the servers so that each copy is identical. However, synchronization of content items is difficult and is associated with numerous technical obstacles.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
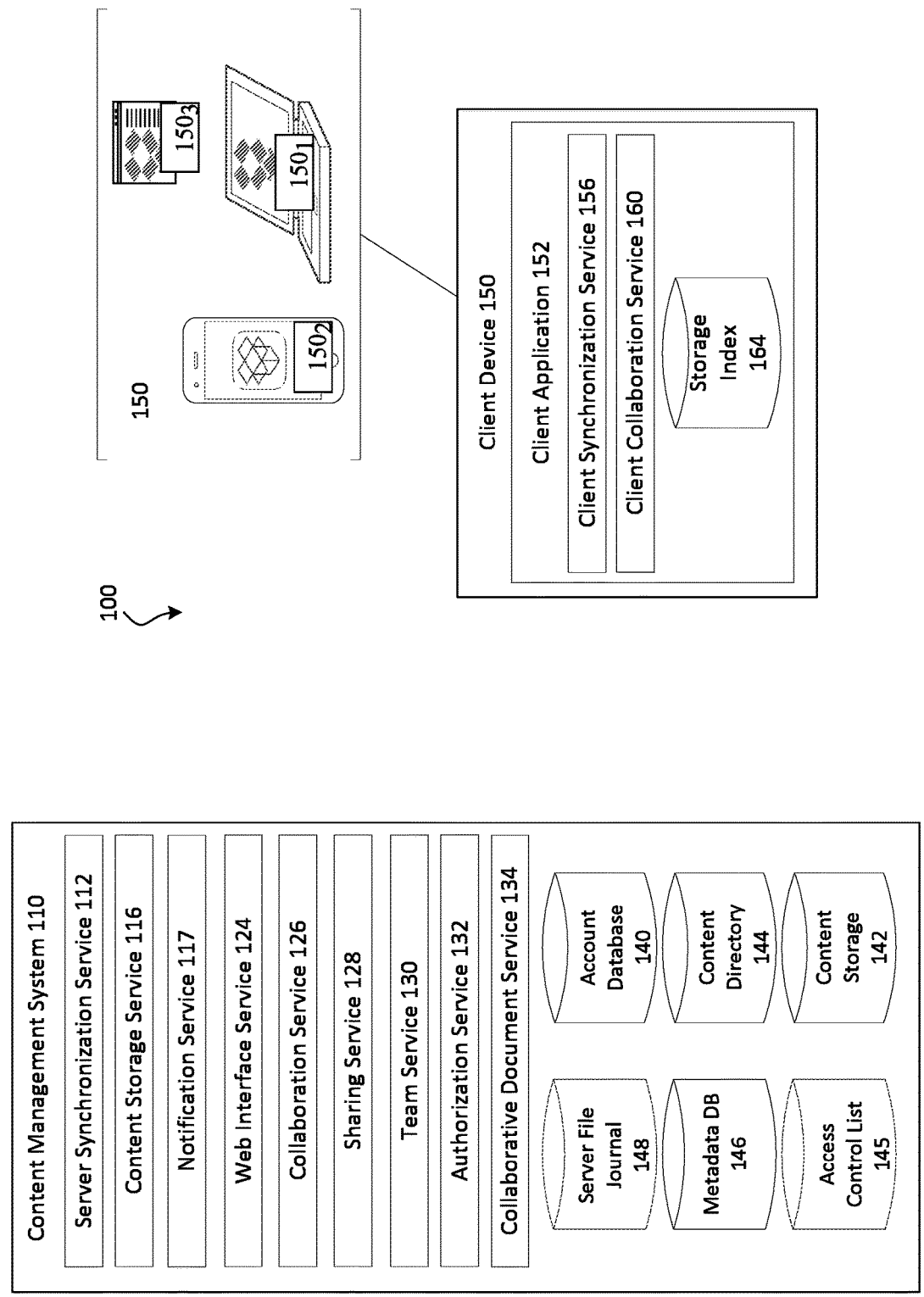
FIG. 1 shows an example of a content management system and client devices, in accordance with some embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Various advances in computing and networking technologies have enabled content management systems to provide users with access to content items across multiple devices. The content items may include, but are not limited to, files, documents, messages (e.g., email messages or text messages), media files (e.g., photos, videos, and audio files), folders containing other content items, or any other unit of content. Content items may be shared with multiple users, edited, deleted, added, renamed, or moved. However, synchronizing these content items across several computing devices (e.g., servers and client devices) and across several user accounts has remained flawed and rife with technological obstacles.

To illustrate some of the technical obstacles, a first machine (e.g., a client device or server) may send communications to a second machine that provides information about how a user has modified content items managed by the content management system. These communications may be used by the second machine to synchronize the content items on the second machine such that actions performed on content items on the first machine are reflected in content items on the second machine and the content items on the first machine are substantially identical to the content items on the second machine.

However, there may be several communications sent and the communications may be received out of order as a result of various network routing protocols used by the one or more networks used to transmit the communications, the technical operations of the first or second machine, or some other reason. Furthermore, a user may be performing a large number of modifications to a large number of content items, undoing previous modifications in a short amount of time, or quickly performing additional modifications to a previously modified content item or set of content items. This increases the likelihood that these communications are received out of order, certain communications are out of date, or that the second machine will perform operations on content items that are not up to date. As a result, many of the operations may not be compatible with the current state of the content items. In fact, it may be difficult to even detect whether some operations are in conflict with other operations or with the current state of the content items.

Additionally, there is an inherent latency with respect to synchronization actions. For example, actions taken on the first machine are first detected by the first machine, and a communication is generated and then transmitted through a network. The communication is received by the second machine, which may still be processing previous communications and taking actions detailed in the previous communications. In this illustrative scenario, there are several points where latency is introduced by limited computing resources (e.g., bandwidth, memory, processing time, processing cycles, etc.) of the first machine, the second machine, and/or the network. As latency increases the likelihood that communications, for some reason, conflict with the current state of the content items increases. Furthermore, processing these conflicted communications and resolving the conflicts also expends needless computing resources such as processing time, memory, energy, or bandwidth and further increases latency.

To further complicate matters, the same or different user on the second machine and/or additional machines with access to the content items may also be performing modification to the content items. As a result, the issues above may be multiplied and additional technical issues arise as to whether local actions conflict with remote actions and/or whether local actions are operating on up to date content items.

The disclosed technology addresses the need in the art for a client synchronization service for a content management system that provides a technical solution to the technical problems above as well as others. The client synchronization service may be configured to operate on a client device and identify synchronization mismatches between content items on a server of the content management system and corresponding content items on the client device. For each synchronization mismatch, the client synchronization service may identify operations needed to synchronize the content items and initiate those operations.

The client synchronization service may track the status of content items on the server, the status of content items on the client device, and their synchronization state using a set of tree data structures ("trees"). According to some embodiments, a set of 3 trees may be used. The three trees may include a remote tree that represents a server state, a local tree that represents the file system state on the client device, and a sync tree that represents a merge base for the local tree and the remote tree. The merge base may be thought of as a common ancestor of the local tree and the remote tree or a last known synced state between the local tree and the remote tree. Accordingly, the client synchronization service may determine that the server state and the client device state are synchronized when all 3 trees (e.g., the remote tree, the sync tree, and the local tree) are identical.

When a modification to the server state of the content items or the client device file system state ("file system state") of the content items is detected, the client synchronization service updates the appropriate tree and determines whether the server state and the file system state are synchronized based on the triumvirate of trees. Based on the update to one of the trees, the server state and the file system state may become synchronized, unsynchronized, or further unsynchronized. If the server state and the file system state are not synchronized, the client synchronization service may identify at least an initial set of operations needed to converge the server state and the file system state and get the server state and the file system state closer to a synchronized state.

By relying on the set of tree data structures to monitor the server state and the file system state provides alternatives and/or solutions rooted in computing technology to various technical problems. For example, the client synchronization service is able to track the server state as well as the file state and store a representation of a merge base of the two states. As a result, the various embodiments of the subject technology avoid the technical problems associated with receiving a number of communications specifying how users are modifying content items remotely and determining which order these modifications should be implemented locally, whether the modifications conflict with other modifications or are out of date, and whether remote modifications conflict with local modifications performed locally by users. Many of these issues arise from other solutions not being able to track the state of the various actors involved (e.g., the server and the client device) and not being able to quickly determine whether the states are in sync. Instead, these other solutions rely on receiving instructions on how to modify content items locally, without the context of whether the server state and file system state are in sync.

Furthermore, since the server state and the file system state are continuously monitored, determining whether they are synced is much more efficient in terms of procedural complexity as well as computing time and resources. As is described in further detail below, the client synchronization service enables the incremental and methodical synchronization of the server state and the file system state in a more deterministic manner. As a result, the scaling and testing of content management system features is also more efficient.

Given the scale of the function performed and the technical complexity of the client synchronization service, it is difficult to ensure that the client synchronization operates as intended in all possible scenarios. Relatedly, it is also difficult to identify scenarios where the client synchronization service does not operate as intended such that the client synchronization service can be debugged. Although reports of bugs may be submitted by users in the normal course of operation of the client synchronization service, these reports may not test a large enough number of scenarios or a diverse enough variety of scenarios to be confident of robust operation of the client synchronization service. The reports also may not contain all the information needed to debug the client synchronization service or recreate the scenario. Because the server state and file system state may be in a constant state of flux, the scenario that caused unintended operation may not be present when the bug report is generated, sent, received, or opened for debugging. Additionally, it is generally more desirable to identify bugs and correct them before end users discover them.

Aspects of the subject technology relate to a debugging system configured to detect errors in the operation of the client synchronization service. The debugging system may generate an initial tree state of three trees (a local tree, a remote tree, and a sync tree) and provide the initial tree state as input to the client synchronization engine to run on. The initial tree state may represent a possible scenario for the client synchronization engine to operate on. The client synchronization engine performs the synchronization process and outputs an end tree state that, according to the client synchronization engine, should be synchronized. The debugging system tests the end tree state to determine whether the end tree state is in fact synchronized. If an error is detected, the debugging system may attempt to reduce the initial tree state down and re-test the client synchronization engine in order to attempt to recreate the error with a more manageable initial tree state. The reduced initial tree state may be recorded and provided to a quality assurance system or engineer for debugging. This process may be repeated to identify a larger set of problem scenarios that, once debugged, may greatly increase the robustness of operation of the client synchronization service.

Content Management System

In some embodiments, the disclosed technology is deployed in the context of a content management system having content item synchronization capabilities and collaboration features, among others. An example system configuration 100 is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device 150₁ is a computing device having a local file system accessible by multiple applications resident thereon. Client device 150₂ is a computing device wherein content items are only accessible to a specific application or by permission given by the specific application, and the content items are typically stored either in an application specific space or in the cloud. Client device 150₃ is any client device accessing content management system 110 via a web browser and accessing content items via a web interface. While example client devices 150₁, 150₂, and 150₃ are depicted in form factors such as a laptop, mobile device, or web browser, it should be understood that the descriptions thereof are not limited to devices of these example form factors. For example a mobile device such as client 150₂ might have a local file system accessible by multiple applications resident thereon, or client 150₂ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc., as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Team's service 130 can provide a common shared space for the team, private user account folders, and access limited shared folders. Team's service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Client Synchronization Service

Figure 2:
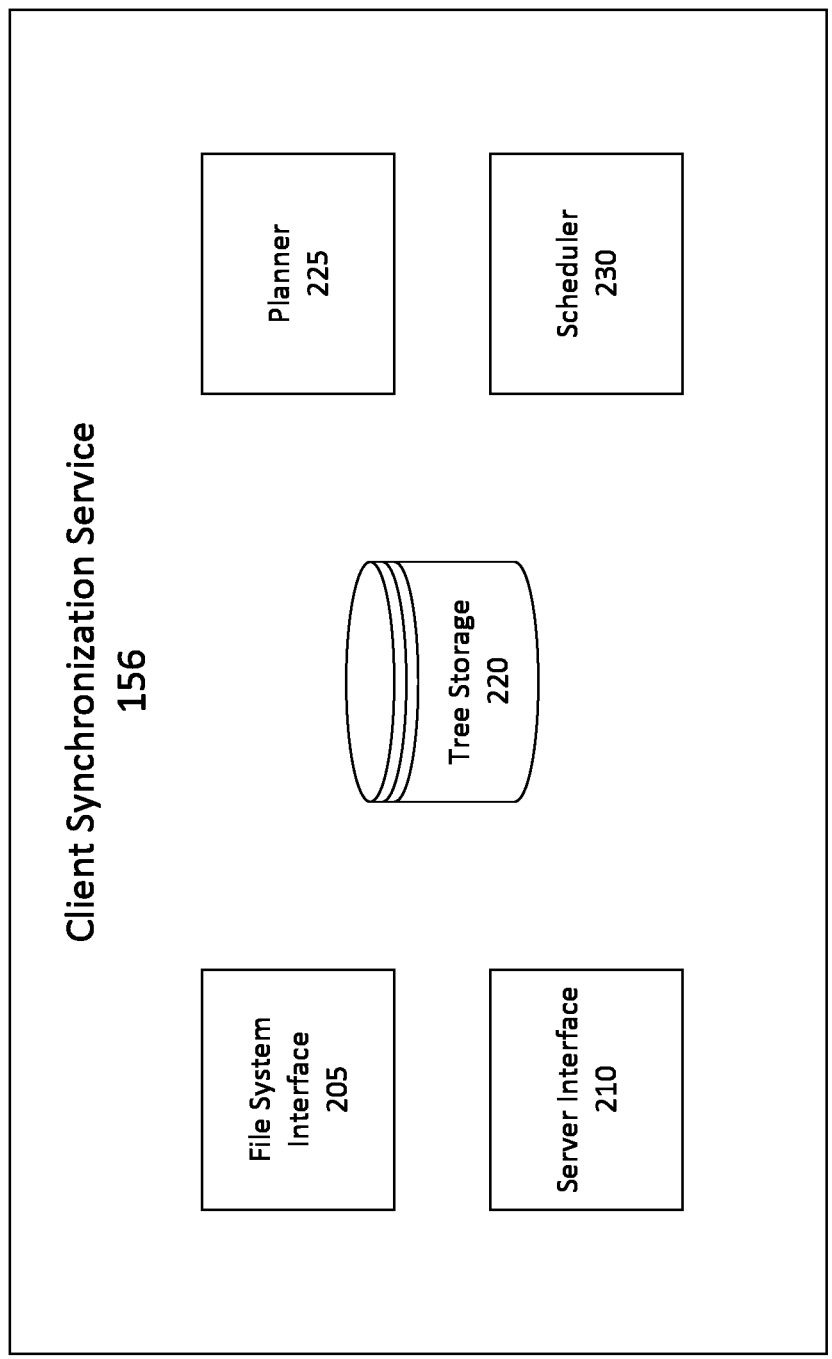
FIG. 2 shows an example of a client synchronization service, in accordance with some embodiments.

FIG. 2 shows an example of a client synchronization service 156, in accordance with some embodiments. According to some embodiments, client synchronization service 156 may be implemented in the client device of FIG. 1. However, in other embodiments, client synchronization service 156 may be implemented on another computing device. Client synchronization service 156 is configured to synchronize changes to content items between a content management system and the client device on which client synchronization service 156 runs.

Client synchronization service 156 may include file system interface 205, server interface 210, tree storage 220, planner 225, and scheduler 230. Additional or alternative components may also be included. High level descriptions of client synchronization service 156 and its components are discussed below with respect to FIG. 2. However, further details and embodiments of client synchronization service 156 and its components are discussed throughout.

File system interface 205 is configured to process changes to content items on the local filesystem of the client device and update the local tree. For example, file system interface 205 can be in communication with client synchronization service 156 of FIG. 1 to detect changes to content items on the local filesystem of the client device. Changes may also be made and detected via client application 152 of FIG. 1. File system interface 205 may make updates to the local tree. The updates to the local tree may be made based on the changes (new, deleted, modified, copied, renamed, or moved content items) to content items on the client device.

Server interface 210 is configured to aid in the processing of remote changes to content items at a remote storage of the content management system and updating of the remote tree. For example, server interface 210 can be in communication with server synchronization service 112 of FIG. 1 to synchronize changes to content items between client device 150 and content management system 110. Changes (new, deleted, modified, copied, renamed, or moved content items) to content items at content management system 110 may be detected and updates may be made to the remote tree to reflect the changes at content management system 110.

Tree storage 220 is configured to store and maintain the tree data structures used by client synchronization service 156. For example, tree storage 220 may store the local tree, the sync tree, and the remote tree. According to some embodiments, tree storage 220 may store the tree data structures in persistent memory (e.g., a hard disk or other secondary storage device) as well as in main memory (e.g., RAM or other primary storage device) in order to reduce latency and response time. For example, on start-up of the client device or client synchronization service 156, the tree data structures may be retrieved from persistent memory and loaded into main memory. Tree storage 220 may access and update the tree data structures on main memory and, before the client device or client synchronization service 156 is shut down, tree storage 220 may store the updated tree data structures on persistent memory. Because main memory is expensive in cost and often limited in size on most client devices, additional technological improvements are implemented to decrease the footprint of the tree data structures on main memory. These technological solutions are described further below.

Planner 225 is configured to detect differences between the server state associated with the content management system and the file system state associated with the client device based on the state of the tree data structures. For example, planner 225 may determine if there is a difference between the remote tree and the sync tree. A difference between the remote tree and the sync tree indicates that an action performed remotely on one or more content items stored at the content management system has caused the server state and the file system state to become out of sync. Similarly, planner 225 may also determine if there is a difference between the local tree and the sync tree. A difference between the local tree and the sync tree indicates that an action performed locally on one or more content items stored on the client device has caused the server state and the file system state to become out of sync. If a difference is detected, planner 225 generates a set of operations that synchronize the tree data structures.

In some scenarios, a set of operations generated based on a difference between the remote tree and the sync tree and a set of operations generated based on a difference between the local tree and the sync tree may conflict. Planner 225 may also be configured to merge the two sets of operations into a single merged plan of operations.

Scheduler 230 is configured to take the generated plan of operations and manage the execution of those operations. According to some embodiments, scheduler 230 converts each operation in the plan of operations into a series of one or more tasks that need to be executed in order to perform the operation. In some scenarios, some tasks may become out dated or no longer relevant. Scheduler 230 is configured to identify those tasks and cancel them.

Tree Data Structures

Figure 3:
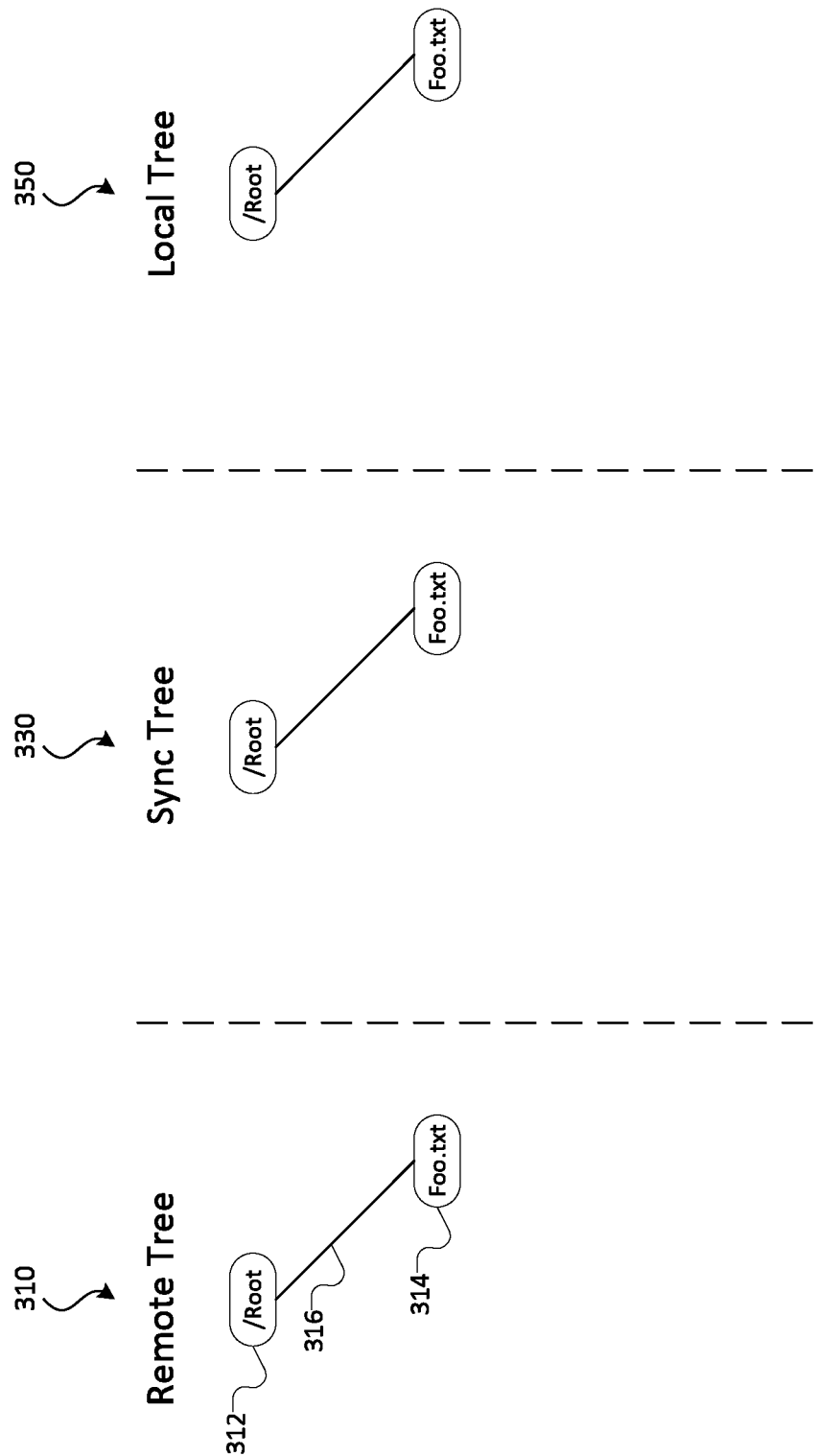
FIG. 3 shows an example of tree data structures, in accordance with various embodiments.

FIG. 3 shows an example of tree data structures, in accordance with various embodiments. The tree data structures may be stored at the client device and managed by a client synchronization service such as client synchronization service 156 in FIG. 2. In FIG. 3, the tree data structures are shown including remote tree 310, sync tree 330, and local tree 350.

Remote tree 310 represents a server state or the state of content items stored remotely from the client device (e.g., on a server of the content management system). Local tree 350 represents a file system state or the state of the corresponding content items stored locally on the client device. Sync tree 330 represents a merge base for the local tree and the remote tree. The merge base may be thought of as a common ancestor of the local tree and the remote tree or a last known synced state between the local tree and the remote tree.

Each tree data structure (e.g., remote tree 310, sync tree 330, or local tree 350) may include one or more nodes. Each node may have one or more child nodes and the parent-child relationship is represented by an edge. For example, remote tree 310 includes nodes 312 and 314. Node 312 is a parent of node 314 and node 314 is a child of node 312. This parent-child relationship is represented by edge 316. A root node, such as root node 312, does not have a parent node. A leaf node, such as node 314, does not have a child node.

Each node in a tree data structure may represent a content item (e.g., a file, document, folder, etc.). For example, root node 312 may represent the root folder associated with the content management system and node 314 may represent a file (e.g., a text file named "Foo.txt") located in that root folder. Each node in a tree data structure may contain data such as, for example, a directory file identifier ("DirFileID") specifying the file identifier of a parent node of the content item, a file name for the content item, a file identifier for the content item, and metadata for the content item.

As described above, a client synchronization service may determine that the server state and the file system state of the client device are synchronized when all 3 trees (e.g., remote tree 310, sync tree 330, and local tree 350) are identical. In other words, the trees are synchronized when their tree structures and the relationships that they express are identical and the data contained in their nodes are identical as well. Conversely, the trees are not synchronized if the 3 trees are not identical. In the example scenario illustrated in FIG. 3, remote tree 310, sync tree 330, and local tree 350 are shown as being identical and synchronized and, as a result, the server state and the file system state are synchronized.

Tracking Changes Using Tree Data Structures

Figure 4:
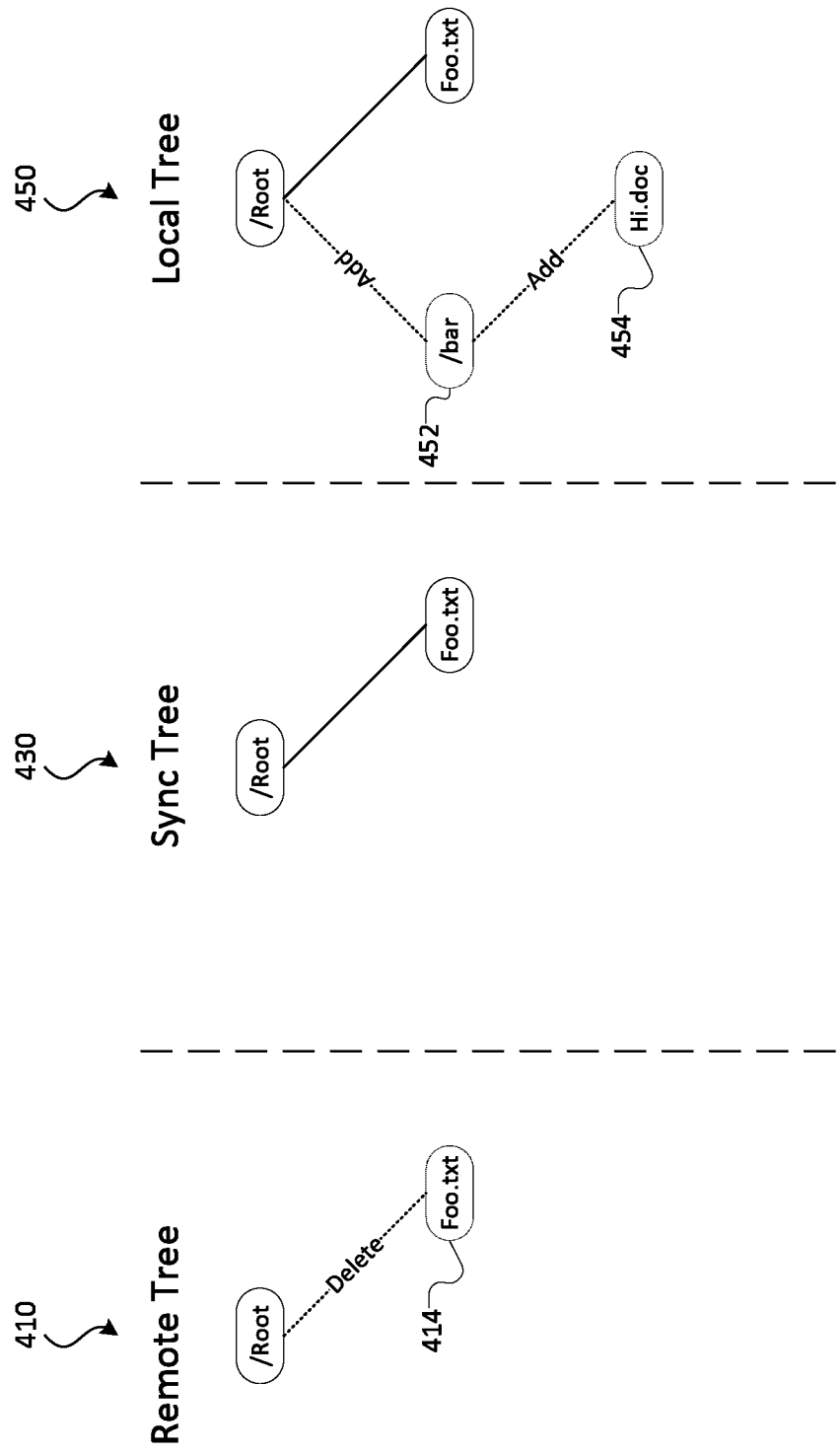
FIG. 4 shows an example of tree data structures, in accordance with various embodiments.

FIG. 4 shows an example of tree data structures, in accordance with various embodiments. As with the tree data structures shown in FIG. 3, the tree data structures shown in FIG. 4 (including remote tree 410, sync tree 430, and local tree 450) may be stored at the client device and managed by a client synchronization service such as client synchronization service 156 in FIG. 2. In FIG. 4, the tree data structures are shown.

FIG. 4 shows a scenario after a previously synchronized state, such as the scenario illustrated in FIG. 3, additional actions are performed on the content items represented in the trees to modify the content items such that the trees are no longer in sync. Sync tree 430 maintains a representation of the previously known synchronized state and may be used by the client synchronization service to identify the differences between the server state and the file system state as well as generate operations for the content management system and/or the client device to perform to converge so that the server state and the file system state are synchronized.

For example, a user (the same user as the user associated with the client device or a different user with access to the content item) may make modifications to the "foo.txt" content item stored by the content management system. This content item is represented by node 414 in remote tree 410. The modification shown in the remote tree 410 is a removal (e.g., a removal of the content item from a space managed by the content management system) or deletion of the foo.txt content item. These modifications may be performed, for example, on another client device and then synchronized to the content management system or performed through a web browser connected to the content management system.

When the change is made on the content management system, the content management system generates modification data specifying the change made and transmits the modification data to the client synchronization service on the client device. For example, using a push model where the content management system may transmit or "push" changes to the client device unilaterally. In other implementations, a pull model where the server sends the changes in response to a request by the client device. Additionally, a hybrid model involving a long pull where the client device initiates the requests but keeps the connection open for a period of time so the content management system can push additional changes as needed while the connection is live. The client synchronization service updates the remote tree representing the server state for the content items stored by the content management system based on the modification data. For example, in remote tree 410, node 414 representing the foo.txt content item is shown as deleted.

The client synchronization service may identify a difference between remote tree 410 and sync tree 430 and, as a result, determine that a modification of the content items at the content management system has caused the server state and the file system state to no longer be in sync. The client synchronization service may further generate and execute a set or sequence of operations for the content items stored on the client device that are configured to converge the server state and the file system state so that they will be in sync.

Additionally or alternatively, a user (the same user as the user associated with modifications at the content management system or a different user with access to the content item) may make modifications to the content items stored locally on the client device that are associated with the content management system. For example, the user may add a folder "/bar" to the "/root" folder and add a "Hi.doc" document to the "/bar" folder.

When the change is made on the client device, the client device (e.g., client synchronization service 156 or client application 152 of FIG. 1) generates modification data specifying the change made. The client synchronization service updates the local tree representing the file system state for the content items stored on the client device based on the modification data. For example, in local tree 450, node 452 and node 454 are shown as added. Node 452 and node 454 represent the "/bar" folder and the "Hi.doc" document respectively.

The client synchronization service may identify a difference between local tree 450 and sync tree 430 and, as a result, determine that a modification of the content items at the client device has caused the server state and the file system state to no longer be in sync. The client synchronization service may further generate a set or sequence of operations for the content items stored by the content management system that are configured to converge the server state and the file system state so that they will be in sync. These operations may be transmitted to the content management system for execution.

As seen in FIG. 4, modifications to content items stored on the client device and content items stored by the content management system may occur at substantially the same time or within a particular time period. These modifications can be reflected in the tree data structures and used by the client synchronization service to generate operations for the client device and for the content management system in parallel. In other scenarios, however, modifications may not necessarily occur within the same time period and operations may be generated in an as-needed manner. Furthermore, although FIG. 4 illustrates scenarios for adding content items and deleting content items, other types of modifications such as, editing, renaming, copying, or moving content items are also supported.

According to various embodiments, identifying a difference between two tree data structures and generating operations may involve checking each node in both tree data structures and determining whether an action has been performed on the node. The actions may include, for example, the addition of the node, the deletion of the node, the editing of the node, or the moving of the node. These actions may then be used to generate the operations configured to converge the server state and the file system state.

For example, if the two tree data structures are a sync tree and a remote tree, the client synchronization service may identify each node in the sync tree by, for example, requesting the file identifiers of all nodes in the sync tree. For each node or file identifier for the node in the sync tree, the client synchronization service may determine if the node or file identifier is also in the remote tree. A node or file identifier in the sync tree that is not found in the remote tree may indicate that the node has been deleted from the server state that is represented by the remote tree. Accordingly, the client synchronization service may determine that a delete action has occurred on the remote tree. If the node or file identifier for the node is found in the remote tree, the client synchronization service may check whether the node in the remote tree has been edited or moved.

To determine whether the node in the remote tree has been edited with respect to the node in the sync tree, the client synchronization service may compare the metadata for the node in the sync tree with the metadata for the corresponding node (e.g., the node with the same file identifier) in the remote tree. The metadata may include information that may be used to determine whether the content item represented by the node has been edited. For example, the metadata may include one or more hash values that are generated based on the data in the content item or a portion thereof. The metadata may additionally or alternatively include a size value, a last modified value, or other value for the content item. The metadata for the node in the sync tree may be compared with the metadata for the node in the remote tree. If the metadata do not match, an edit of the content item may have been edited in the server state represented by the remote tree. Accordingly, the client synchronization service may determine that an edit action has occurred for the node on the remote tree. If the metadata matches, no edit may have occurred.

To determine whether the node in the remote tree has been moved, the client synchronization service may compare the location for the node in the sync tree with the location for the corresponding node (e.g., the node with the same file identifier) in the remote tree. The location may include, for example, a path where the node is located, a file name, and/or a directory file identifier ("DirFileID") specifying the file identifier of the node's parent. If the locations match, no move may have occurred. On the other hand, if the locations do not match, a move of the content item may have occurred in the server state represented by the remote tree. Accordingly, the client synchronization service may determine that a move action has occurred for the node on the remote tree.

To determine whether a node has been added to the remote tree, the client synchronization service may identify any nodes or file identifiers in the remote tree that are not found in the sync tree. If a node or file identifier is found in the remote tree and not found in the sync tree, the client synchronization service may determine that an add action of this node has occurred on the remote tree representing the server state.

Although the example above is described with respect to the sync tree and the remote tree, in other embodiments, a similar process may occur with the sync tree and a local tree in order to identify a difference between the sync tree and the local tree and determine which actions have occurred on the local tree representing the file system state.

Synchronization Using Tree Data Structures

Figure 5:
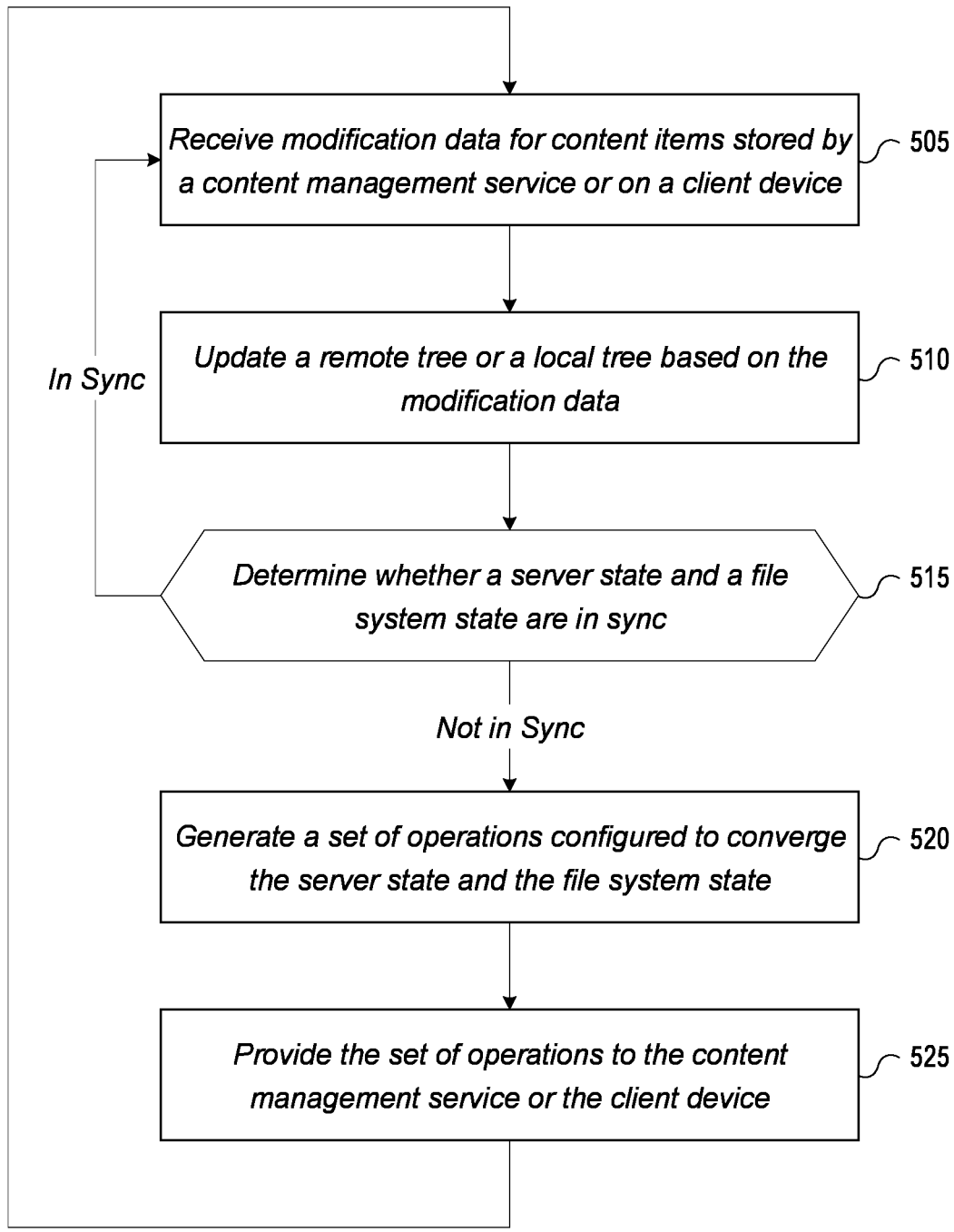
FIG. 5 shows an example method for synchronizing a server state and a file system state using tree data structures, in accordance with various embodiments of the subject technology.

FIG. 5 shows an example method for synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 500 may be implemented by a system such as, for example, client synchronization service 156 of FIG. 2, running on a client device.

The system is configured to identify a difference between a remote tree representing a server state for content items stored by the content management system, a local tree representing the file system state for the corresponding content items stored on the client device, and a sync tree representing a known synced state between the server state and the file system state. Based on these differences, a set of operations may be generated that, if executed, are configured to converge the server state and the file system state towards a synchronized state where the three tree data structures would be identical.

For example, at operation 505, the system may receive modification data for content items stored by a content management system or on a client device. The modification data may be used to update a remote tree or a local tree at operation 510.

The modification data specifies what changes occurred to one or more content items associated with a content management service. Accordingly, the modification data may be received from the content management system or from the client device (e.g., from client application 152 running on client device 150 in FIG. 1). Modification data received from the content management system may be referred to as server modification data. Server modification data specifies what changes are done to one or more content items by the content management system and may be used to update the remote tree at operation 510. Modification data received from the client device may be referred to as client modification data. Client modification data specifies what changes are done to one or more content items on the client device and may be used to update the local tree at operation 510.

At operation 515, the system may determine whether a server state for content items stored by the content management system and a file system state for the content items stored on the client device are in sync. Because the local tree and the remote tree are representative of the file system state and the server state and are continually being updated to track changes that occur at the content management system and the client device, determining whether the server state and the file system state are in sync may be done by comparing the local tree and/or the remote tree to the sync tree to find differences between the trees. This process of finding differences between the trees is sometimes referred to as "diffing" the trees.

According to some embodiments and scenarios, determining whether the server state and the file system state are in sync may include one or more of identifying differences between the remote tree and the sync tree and/or identifying differences between the local tree and the sync tree. Differences between the remote tree and sync tree may indicate the occurrence of changes to content items stored by the content management system that may not be reflected at the client device. Similarly, differences between the local tree and sync tree may indicate the occurrence of changes to content items stored at the client device that may not be reflected at the content management system.

If there are no differences between the trees, the server state and the file system state are in sync and no synchronization actions are needed. Accordingly, the method may return to operation 505 and await new modification data. On the other hand, if differences are detected, the system may generate a set of operations configured to converge the server state and the file system state at operation 520.

The set of operations generated depends on the one or more differences that are detected. For example, if the difference between two trees is an added content item, the generated set of operations may include retrieving the added content item and adding it. If the difference between two trees is a deletion of a content item, the generated set of operations may include deleting the content item. According to some embodiments, the set of operations may also include a number of checks to ensure tree constraints are maintained. As will be described further below, the set of operations may conflict with the current state of the server state, the file system state, or other operations that are pending execution. Accordingly, the system may also resolve these conflicts before proceeding.

As noted above, if there are differences between the remote tree and sync tree, changes to content items stored by the content management system may have occurred that may not be reflected at the client device. Accordingly, in this scenario, the system may generate a client set of operations configured to operate on the content items stored on the client device to converge the server state and the file system state and this client set of operations may be provided to the client device for execution at operation 525.

Similarly, if there are differences between the local tree and sync tree, changes to content items stored at the client device may have occurred that may not be reflected at the content management system. Accordingly, in this scenario, the system may generate a server set of operations configured to operate on the content items stored by the content management system to converge the server state and the file system state and this server set of operations may be provided to the content management system for execution at operation 525. In some cases, both cases may be true and a client set of operations and a server set of operations may be generated and provided to their intended recipients at operation 525.

Once the set(s) of operations are provided to the intended recipient(s), the method may return to operation 505 and await new modification data. The set(s) of operations may provide one or more steps towards the convergence of the server state and the file system state or provide all steps needed to sync the server state and the file system state. For example, the content management system may receive the server set of operations and execute the server set of operations on content items stored by the content management system. This execution of the server set of operations causes changes to the content items stored by the content management system, which are detected and specified in server modification data, which is transmitted back to the system. The system may then update the remote tree and determine whether the server state and the file system state are in sync.

The client device may receive the client set of operations and execute the client set of operations on content items stored on the client device. This execution of the client set of operations causes changes to the content items stored on the client device, which are detected and specified in client modification data, which is passed to the system. The system may then update the local tree and determine whether the server state and the file system state are in sync. These operations of method 500 may continue until the server state and the file system state are in sync.

The operations of method 500 are described with respect to a client side and a server side (e.g., a local tree and a remote tree, a file system state and a server state, a client set of operations and a server set of operations, client modification data and server modification data). In various embodiments the operations associated with the two sides may occur in parallel, in sequence, in isolation of the other side, or a combination.

As will be discussed in further detail, in accordance with some embodiments, before the operations are provided for execution, the system may check the operations to determine whether they comply with a set of rules or invariants. If an operation violates a rule, the system executes a resolution process associated with the violation of the rule.

Additionally, in accordance with some embodiments, the system (e.g., scheduler 230 of client synchronization service

156 in FIG. 2) may manage the execution of the set of operations. For example, each operation in the set of operations may be associated with a task, an execution thread, series of steps, or instructions. The system may be configured to execute the task, thread, step, or instructions and interface with the client device and/or the content management system to execute the set of operations and converge the server state and the file system state.

Conflict Handling

As described above with respect to FIG. 5, differences between a sync tree and a remote tree are identified and used to generate a client set of operations configured to converge the server state and the file system state. However, in some cases, the client set of operations may conflict with the current state of a local tree. Similarly, differences between the sync tree and the local tree are identified and used to generate a server set of operations configured to converge the server state and the file system state. However, the server set of operations may conflict with the current state of the remote tree. Additionally or alternatively, the client set of operations and the server set of operations may conflict with one another or violate another rule or invariant maintained by the system. Accordingly, various embodiments of the subject technology provide additional technical improvements by resolving these conflicts.

For example, planner 225 in client synchronization service 156 of FIG. 2 may identify an operation in a set of operations (e.g., the client set of operations or the server set of operations) that conflicts with a rule. Each rule used to identify a conflict may also be associated with a resolution for the conflict. The client synchronization service may update the set of operations based on the resolution for the conflict or resolve the conflict by performing operations associated with the resolutions for the conflict before providing the set of operations for execution.

Figure 6:
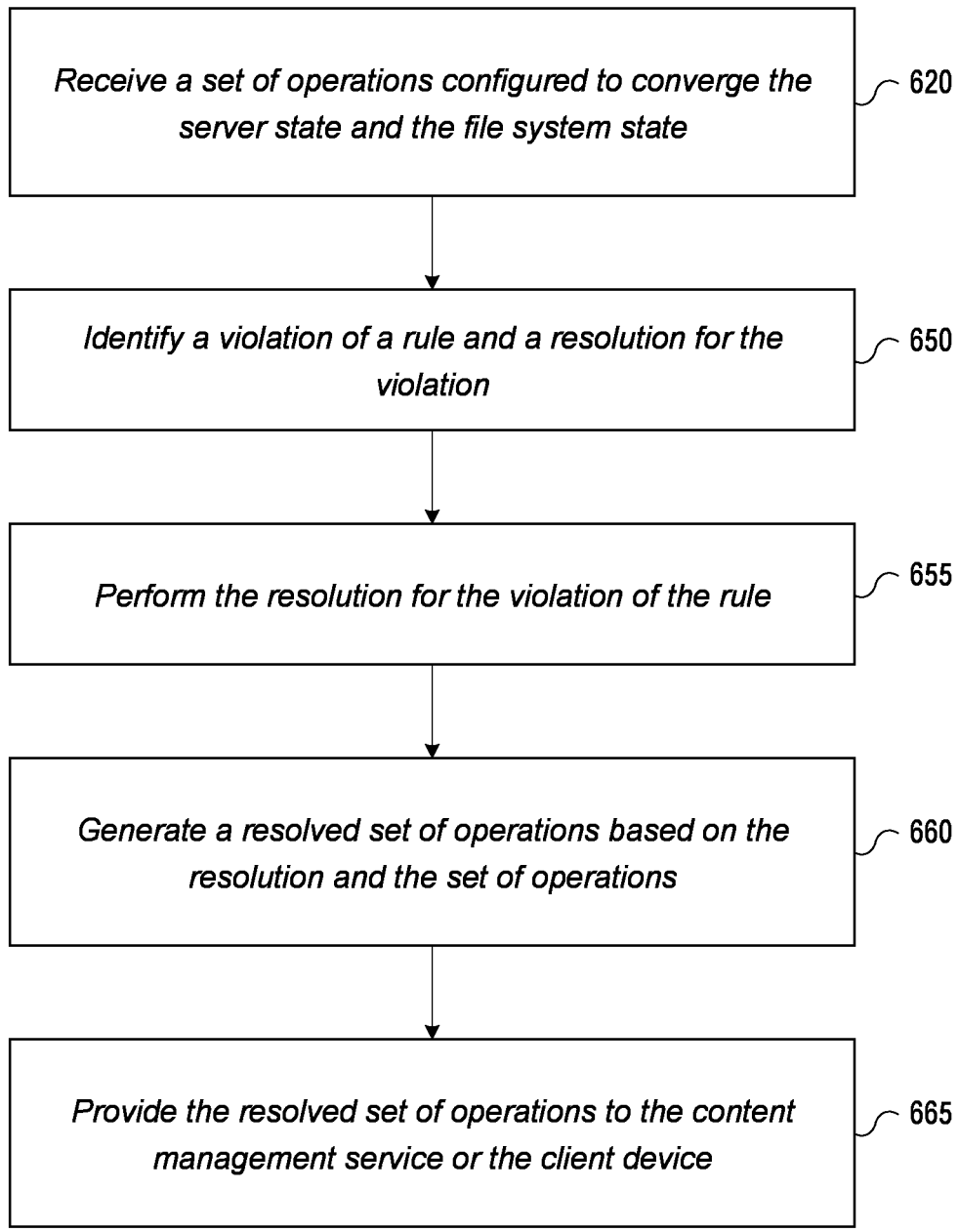
FIG. 6 shows an example method for resolving conflicts when synchronizing a server state and a file system state using tree data structures, in accordance with various embodiments of the subject technology.

FIG. 6 shows an example method 600 for resolving conflicts when synchronizing a server state and a file system state using tree data structures, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 600 may be implemented by a system such as, for example, client synchronization service 156 of FIG. 2, running on a client device.

The system may receive a set of operations configured to converge a server state and a file system state at operation 620. The set of operations may be, for example, the client set of operations, the server set of operations, or a combined set of operations generated and described with respect to the method 500 of FIG. 5.

At operation 650, the system identifies one or more violations in the set of operations based on a set of rules. The set of rules may be stored by client synchronization service 156 in FIG. 2 and specify a number of constraints, invariants, or conflicts for operations that are to be resolved. The set of rules may be applied to the tree data structures and help control synchronization behavior. Each rule in the set of rules may also be associated or otherwise linked to a resolution to a violation of that rule. For example, the resolution may include an alteration of one or more operations in the set of operations, a removal off one or more operations, an addition of one or more operations, one or more additional actions to the server state or the file system state, or a combination of actions.

For each operation in a set of operations, the system may determine whether any rule in the set of rules is violated. If a rule is violated, the system identifies a resolution of the violation and, at operation 655, performs the resolution. The resolution may include actions such as modifying one or more operations in the set of operations, a removing or adding one or more operations, or additional actions on the server state or the file state.

Once the resolution actions are performed, the system may generate a resolved or rebased set of operations based on the resolution and the set of operations at operation 660 and, at operation 665, provide the resolved set of operations to the appropriate entity for execution. For example, the resolved set of operations may be provided to scheduler 230 of client synchronization service 156 in FIG. 2 for managed execution. Alternatively, if the set of operations is a client set of operations, the resolved set of operations may be provided to the client device. If the set of operations is a server set of operations, the resolved set of operations may be provided to the content management service. Additionally, the method 600 of FIG. 6 may be performed on client set of operations and server set of operations in sequence, in parallel, or in various different orders.

According to some embodiments, each type of operation may be associated with the same or a different set of rules. For example, operation types may include, for example, adding a content item, deleting a content item, editing a content item, moving a content item, renaming a content item, etc. The set of operations may consist of operations each belonging to one of the operation types above. Each operation type may be associated with a specific set of rules.

For illustrative purposes, a set of rules for an "Add" operation type may include rules such as file identifiers for content items must be unique in a tree (e.g., no two nodes in a tree may have the same file identifier), a directory file identifier ("DirFileID") specifying the file identifier of a parent node of the content item must exist in the opposite tree data structure, and a DirFileID and file name combination for a content item are not used in the opposite tree.

Opposite tree, as used here, refers to the tree data structure that represents the state of the opposing entity. For example, a client set of operations configured to operate on the client device and the resulting changes to the file system on the client device will be reflected in the local tree. Accordingly, the opposite tree for the client set of operations is the remote tree. Similarly, a server set of operations is configured to be transmitted to the content management system to be executed and the resulting changes to the server state will be reflected in the remote tree. Accordingly, the opposite tree for the server set of operations is the local tree.

Figure 7:
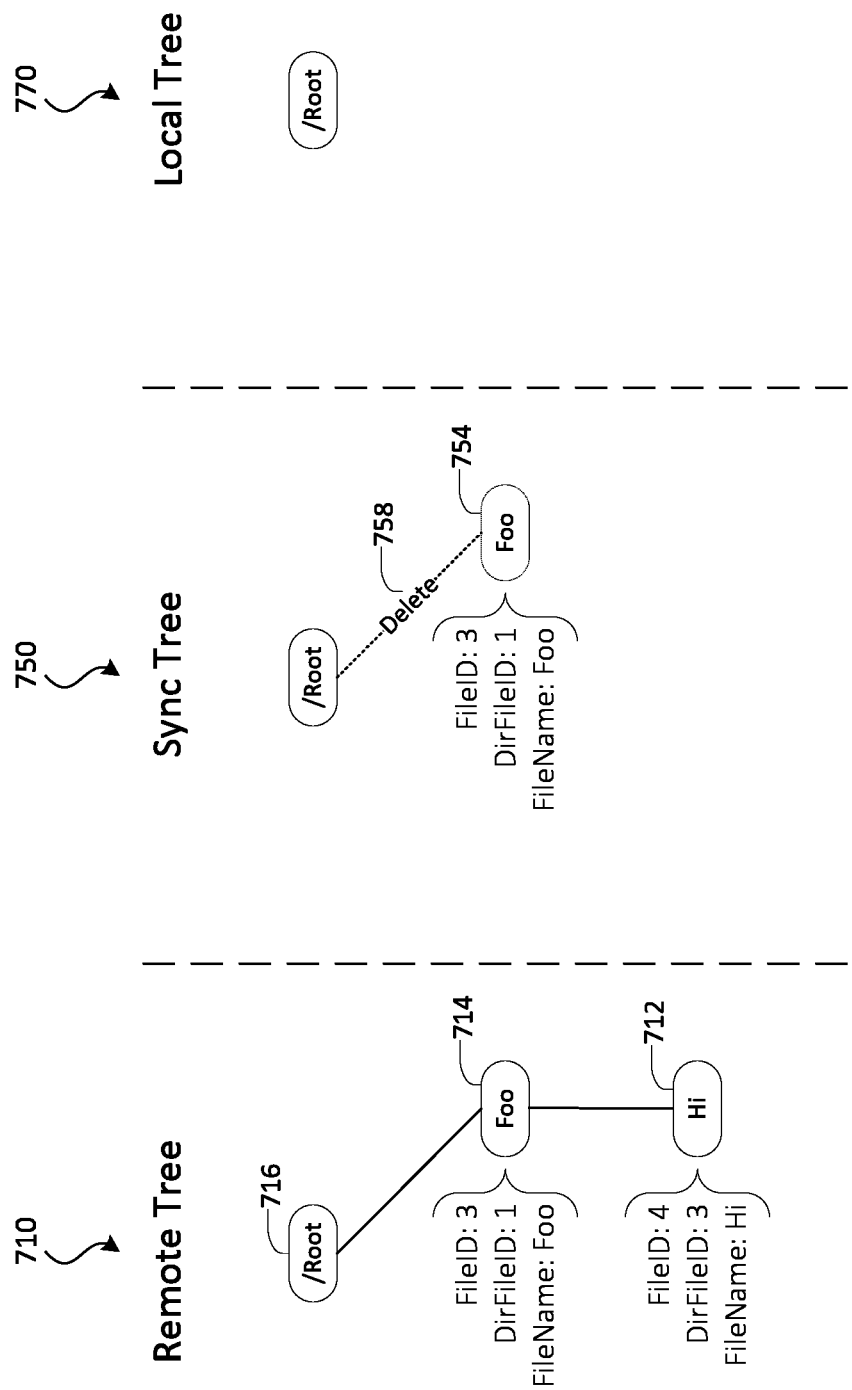
FIG. 7 shows an example of tree data structures illustrating a violation of a rule for an add operation, in accordance with various embodiments.

FIG. 7 shows an example of tree data structures illustrating a violation of a rule for an add operation, in accordance with various embodiments. The tree data structures include remote tree 710, sync tree 750, and local tree 770. When referencing the local tree 770, the remote tree 710 may be considered the opposite tree. On the other hand, when referencing the remote tree 710, the local tree 770 may be considered the opposite tree. FIG. 7 illustrates a set of operations adding the content item represented by node 712 in remote tree 710. For example, a client synchronization service may compare remote tree 710 with sync tree 750, identify the differences, and generate a set of operations that includes the addition of node 712. Node 712 is associated with a FileID of 4, a DirFileID of 3 (which references parent node 714, which is node 712's parent), and a file name of "Hi." Parent node 714 is associated with a FileID of 3, a DirFileID of 1 (which references root node 716, which is node 714's parent), and a file name of "Foo."

The client synchronization service may perform the method 600 of FIG. 6 and determine that the add operation for node 712 violates the "a directory file identifier ("DirFileID") of the content item must exist in the opposite tree data structure" rule for "add" operation types. This is illustrated in FIG. 7 by the local tree 770 not having a node with a file ID of 3, which references parent node 714 of node 712. This may occur when, for example, after differences between remote tree 710 and sync tree 750 are determined and a set of operations is generated, the "Foo" node corresponding to node 714 is removed from the opposite tree.

The resolution associated with this rule may include deleting the node missing from local tree 770 from sync tree 750 to synchronize sync tree 750 and local tree 770 and rediffing (e.g., finding the difference between) remote tree 710 and sync tree 750. In the scenario illustrated in FIG. 7, node 754 in sync tree 750 would be removed 758 and diffing operations would commence to identify differences between remote tree 710 and sync tree 750. This would result in the inclusion of an add operation of node 714 as well as an add operation for node 712 in the set of operations.

Similarly, a violation of the "file identifiers for content items must be unique in a tree" rule for "add" operation types may be resolved by operations including requesting, from the content management system, a new file ID for the node being added and using the new file ID when adding the node. A violation of the "DirFileID and file name combination for a content item are not used in the opposite tree" rule for "add" operation types may be resolved by operations including checking via the metadata associated with the two nodes whether the content items are the same. If the content items are the same, it is likely that the content item being added has already been added in other actions. If the content items are not the same, the file name for the content item being added can be renamed. For example, the file name for the content item being added can be appended with the text "(conflicted version)."

Incremental Planner

Although the various tree data structures shown in FIGS. 3, 4, and 7 contain a relatively small number of nodes and are relatively simple in structure, the tree data structures supported by the system may be much larger and complex with multiple levels and potentially large number of nodes at each level. Accordingly the memory usage required to store the tree data structures during operation may be quite large and the computing time and resources required to operate on the tree data structures may be quite large. For example, finding differences between a remote tree and a sync tree and/or a local tree and the sync tree and generating operations needed to converge the remote tree and the sync tree and/or the local tree and the sync tree may require a large amount of memory, time, and other computing resources.

Unfortunately, these computing resources are limited. For example, a client device may have a limited amount of available memory and the length of time needed to diff trees and generate operations may hinder the usability of the client device, the client application, or the content management services provided by the content management system. Furthermore, the more time needed to converge the server state and the file system state, the more likely that intervening changes to either state may render the set of operations being computed or executed and/or the target sync state out of date. Accordingly, various embodiments of the subject technology provide additional technical improvements by incrementally converging the server state and the file system state along with the tree data structures that represent them.

Figure 8:
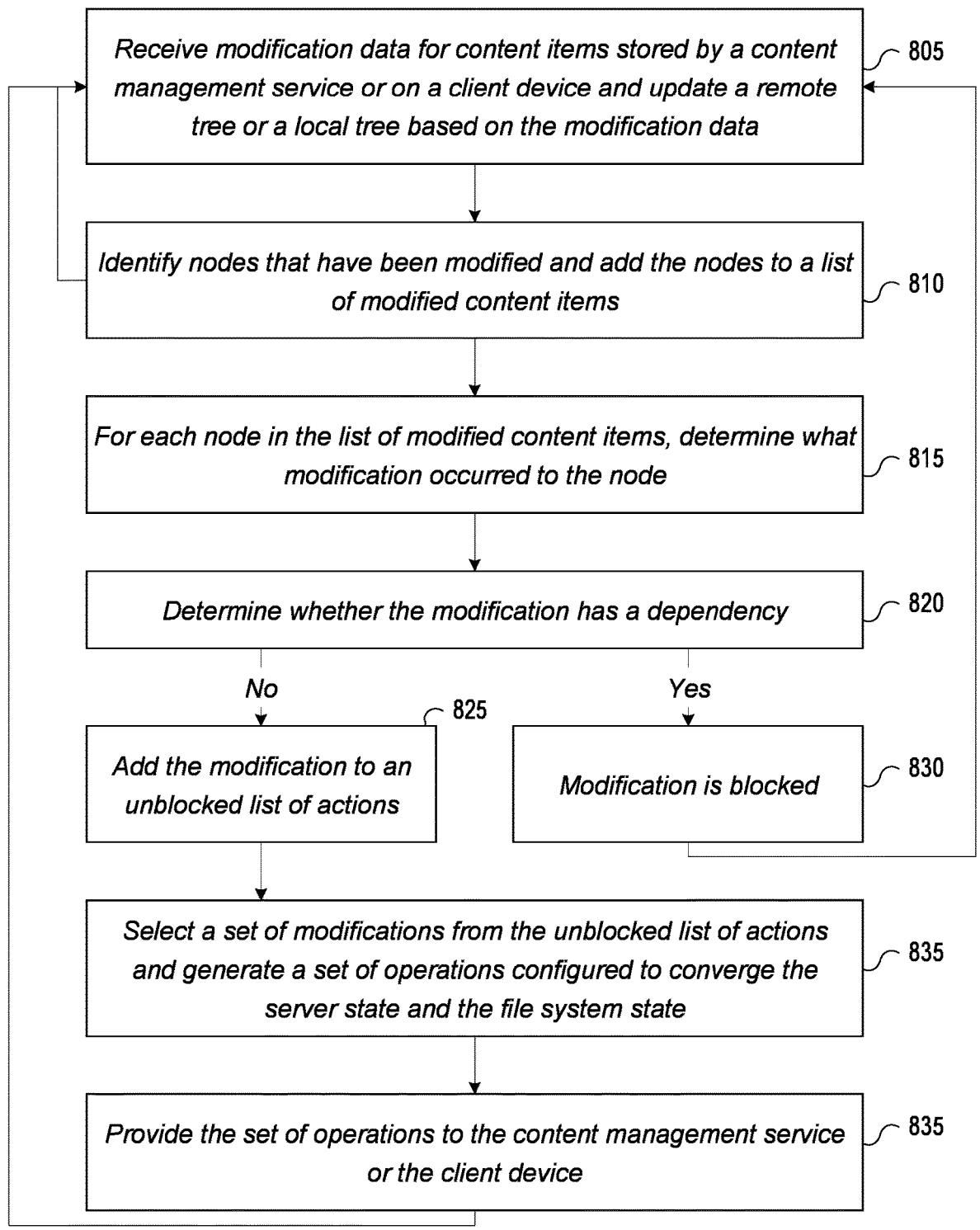
FIG. 8 shows an example method for incrementally converging a server state and a file system state, in accordance with various embodiments of the subject technology.

FIG. 8 shows an example method 800 for incrementally converging a server state and a file system state, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 800 may be implemented by a system such as, for example, client synchronization service 156 of FIG. 2, running on a client device.

At operation 805, the system may receive modification data that may be used to update either a remote tree or a local tree. For example, server modification data may be received from a content management system that specifies modifications or other actions (e.g., an edit, add, delete, move, or rename) associated with one or more content items stored by the content management system. The server modification data may be used to update the remote tree, which represents the server state of content items stored by the content management system. Similarly, client modification data may be received from the client device (e.g., a client application) and specify modifications or other actions associated with one or more content items stored on the client device. The client modification data may be used to update the local tree, which represents the file system state of content items stored on the client device.

Based on the received modification data specifying modifications associated with content items, the system may identify nodes that correspond to the modified content items and add the nodes to a list of modified content items (e.g., add the file identifier associated with the nodes to the list of modified content items) at operation 810. Operations 805 and 810 may continuously occur for some time before the system proceeds to the next stage of the method 800. For example additional modification data may be received and used to update the trees managed by the system and add nodes to the list of modified content items.

In order to incrementally converge the server state and the file system state, the system takes each node in the list of modified content items and determines how the node was modified (e.g., which actions are associated with the node) at operation 815. In some embodiments, the modification data may specify the modification to the node. However, in other embodiments, the system may determine the modifications to the node based on a comparison of the remote tree with the sync tree and/or a comparison of the local tree with the sync tree. For example, the modifications may include the addition of the node, the deletion of the node, the editing of the node, or the moving of the node.

For each node or file identifier for the node in the list of modified content items, the system may perform a series of checks to determine what, if any, modifications were performed on the node. For example, the system may determine whether the file identifier is in the sync tree but not in the remote tree. A file identifier in the sync tree that is not found in the remote tree may indicate that the node has been deleted from the server state that is represented by the remote tree. Accordingly, the client synchronization service may determine that a delete modification on the node has occurred on the remote tree. Similarly, the system may also determine whether the file identifier is in the sync tree but not in the local tree. A file identifier in the sync tree that is not found in the local tree may indicate that the node has been deleted from the file system state that is represented by the local tree. Accordingly, the client synchronization service may determine that a delete modification on the node has occurred on the local tree.

To determine whether an edit modification has been performed on the node, the system may compare the metadata for the node in the sync tree with the metadata for the corresponding node (e.g., the node with the same file identifier) in the remote tree and/or the local tree. The metadata may include information that may be used to determine whether the content item represented by the node has been edited. For example, the metadata may include one or more hash values that are generated based on the data in the content item or a portion thereof. The metadata may additionally or alternatively include a size value, a last modified value, or other value for the content item. If the metadata do not match, an edit of the content item may have been edited in the server state represented by the remote tree and/or the file system state represented by the local tree. Accordingly, the system may determine that an edit action has occurred for the node on the remote tree and/or the local tree.

To determine whether the node in the remote tree has been moved, the system may compare the location for the node in the sync tree with the location for the corresponding node (e.g., the node with the same file identifier) in the remote tree and/or the local tree. The location may include, for example, a path where the node is located, a file name, and/or a directory file identifier ("DirFileID") specifying the file identifier of the node's parent. If the locations match, no move may have occurred. On the other hand, if the locations do not match, a move of the content item may have occurred in the remote tree or the local tree. Accordingly, the client synchronization service may determine that a move action has occurred for the node on the remote tree and/or the local tree.

To determine whether a node has been added to the remote tree, the system may determine if the file identifier in the list of modified content items is in the remote tree or in the local tree, but not in the sync tree. If the file identifier is found in the remote tree or the local tree and not found in the sync tree, the system may determine that an add modification for this node has occurred.

Once the one or more modifications to the nodes in the list of modified content items are determined, the system may determine whether any of those modifications have dependencies at operation 820. As will be illustrated further with respect to FIG. 9, a modification on a node has a dependency when, for example, the modification cannot execute without another modification occurring first.

If the modification does not have a dependency, the system adds the modification to an unblocked list of actions at operation 825. If the modification has a dependency, the modification is blocked for the time being at operation 830 and cannot be executed without another modification being processed first. Accordingly the process returns to operation 805 to await further modifications. After each of the modifications are processed, the system may clear the file identifiers associated with the modifications from the list of modified content items.

Figure 9:
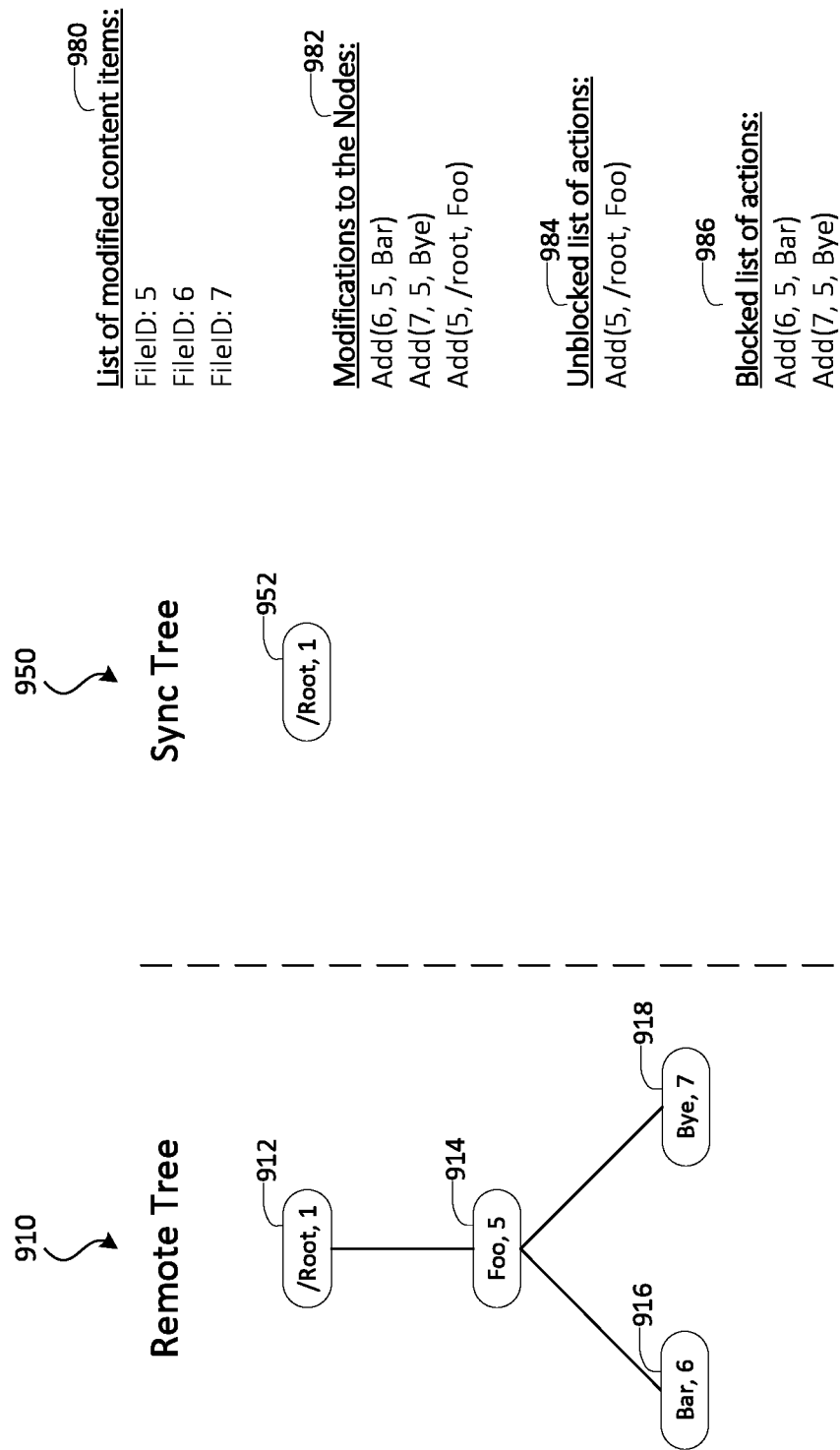
FIG. 9 shows an example of tree data structures, in accordance with various embodiments.

FIG. 9 shows an example of tree data structures, in accordance with various embodiments. The tree data structures shown in FIG. 9 may be stored at the client device and managed by a system such as client synchronization service 156 in FIG. 2. For the purpose of illustration, only remote tree 910 and sync tree 950 are shown in FIG. 9 and described. Similar operations and description may also be applied to a local tree as well.

Remote tree 910 includes root node 912 with a file identifier of 1, node 914 with a file identifier of 5 and file name of "Foo," node 916 with a file identifier of 6 and file name of "Bar," and node 918 with a file identifier of 7 and file name of "Bye." Sync tree includes root node 952 with a file identifier of 1.

Based on the tree data structures shown in FIG. 9, the system may have identified that nodes with file identifiers of 5, 6, and 7 have been modified at operation 810 and added the nodes to the list of modified content items, as illustrated by reference 980 in FIG. 9. At operation 815, the system determines the list of modifications to nodes in the list of modified content items. As is seen by the comparison of remote tree 910 and sync tree 950, nodes 914, 916, and 918 have been added to remote tree 910. More specifically, as illustrated by reference 982 in FIG. 9, node 916 with file identifier 6 and name "Bar" has been added as a child to node 914 with file identifier 5. This is represented by the "Add(6, 5, Bar)" entry in reference 982. Node 918 with file identifier 7 and name "Bye" has been added as a child to node 914 with file identifier 5. This is represented by the "Add(7, 5, Bye)" entry in reference 982. Node 914 with file identifier 5 and name "Foo" has been added as a child to root node 912 with file identifier 1. This is represented by the "Add(5, /root, Foo)" entry in reference 982.

At operation 820, the system determines that the add modification of node 914 does not have a dependency and, as a result, is unblocked. Accordingly, the system adds the modification associated with node 914 (e.g., the modification represented by the "Add(5, /root, Foo)") entry in reference 982) to an unblocked list of actions at operation 825. This is seen in references 984 in FIG. 9. On the other hand, the modifications for nodes 916 and 918 represented by the "Add(6, 5, Bar)" and the "Add(7, 5, Bye)" entries in reference 982 are dependent on the modification represented by the "Add(5, /root, Foo)" occurring first. In other words, node 916 and/or node 918 cannot be added until node 914 is added. Accordingly, these modifications are included in a blocked list of actions illustrated by reference 986 in FIG. 9.

Returning to the method 800 of FIG. 8, at operation 835, the system may select a set of modifications from the unblocked list of actions and generate a set of operations based on the selected set of modifications. The set of operations is configured to converge the server state and the file system state. The set of operations generated depends on the selected set of modifications from the unblocked list. For example, if the selected set of modifications includes the add modification associated with node 914 (e.g., the modification represented by the "Add(5, /root, Foo)") entry in reference 984) in FIG. 9, the generated set of operations may include retrieving the added content item from the content management system and adding it to the local file system of the client device.

According to some embodiments, the system may select all modifications from the unblocked list of actions to generate one or more sets of operations. However, in some scenarios, the number of modifications in the unblocked list may be quite high and the computing resources (e.g., memory and processing time) needed to process all of the modifications is substantial. In order to reduce these technological burdens, the system may select a smaller set of the modifications in the unblocked list of actions in order to process incrementally. For example, the system may select the first or top X number or percent of modifications to generate operations. In further iterations of the process, the remaining modifications in the unblocked lists may be processed.

In some embodiments, the modifications in the unblocked list may be ranked for processing. The modifications may be ranked based on, for example, a modification type (e.g., delete modifications are prioritized over add modifications), metadata associated with the modification (e.g., add modifications of content items of smaller size are prioritized over add modifications of content items of larger size, delete modifications of content items of larger size are prioritized over delete modifications of content items of smaller size, etc.).

These rank rules may be stored by the system and may be designed to achieve various performance goals for content synchronization. For example, delete modifications may be prioritized over add modifications in order to free as much of potentially limited storage space for a user before new content items may be added. Adding of smaller content items may be prioritized over larger content items in order to provide as much progress with respect to the number of content items added as soon as possible.

At operation 835, the system may provide the set of operations to the content management system and/or the client device. As noted above, modifications associated with actions performed by the content management system may not be reflected at the client device. Accordingly, in this scenario, the system may generate a client set of operations configured to operate on the content items stored on the client device to converge the server state and the file system state and this client set of operations may be provided to the client device for execution at operation 835.

On the other hand, modifications associated with actions performed by the client device may not be reflected at the content management system. Accordingly, in this scenario, the system may generate a server set of operations configured to operate on the content items stored by the content management system to converge the server state and the file system state and this server set of operations may be provided to the content management system for execution at operation 835.

In some cases, both cases may be true and a client set of operations and a server set of operations may be generated and provided to their intended recipients at operation 835. The set of operations may also include a number of checks to ensure tree constraints are maintained. For example, the set of operations may resolve various conflicts or constraints as discussed with respect to FIG. 6.

Once the set(s) of operations are provided to the intended recipient(s), the method may return to operation 805 and await new modification data. For example, with respect to the scenario illustrated in FIG. 9, the set of operations may include retrieving the content item associated with node 914 from the content management system and adding it to the local file system of the client device. This would result in the addition of a node corresponding to node 914 in the local tree (not shown in FIG. 9) and sync tree 950. On the next iteration of process 800 of FIG. 8, the add modifications of node 916 and node 918 represented by the "Add(6, 5, Bar)" and the "Add(7, 5, Bye)" entries in reference 982 are no longer blocked because their parent, node 914, has already been added to the sync tree. Accordingly, the add modifications of node 916 and node 918 represented by the "Add(6, 5, Bar)" and the "Add(7, 5, Bye)" entries in reference 982 may be added to the unblocked list of actions and used to generate one or more sets of operations configured to converge the server state and the file system state.

The set(s) of operations may provide one or more steps for the incremental convergence of the server state and the file system state. Although implementing an incremental process may be more complex at times, the incremental process may achieve a reduction in processing time and reduction in the memory required. These and other initial technological improvements naturally lead to additional technological improvements. For example, because processing time is reduced, the likelihood of additional changes from the client device or the content management system making certain modifications obsolete or out of data is reduced as well.

With respect to FIG. 9, various groupings of content items, modifications, actions, or file identifiers are described as lists for the purpose of illustration. Other types of data structures are also compatible. For example, the unblocked list of actions may be implemented as a B-tree data structure in order to keep data sorted and allow searches, sequential access, insertions, and deletions in logarithmic time.

Scheduler

In some embodiments, a client synchronization service may generate a set or sequence of operations configured to converge the server state and the file system state and provide the operations to the content management system or client device for execution. However, in some scenarios, changes on the file system of the client device or on the content management system may cause the generated set of operations to become out of date or obsolete while the set of operations is in the process of executing. Various embodiments are directed to providing a technical solution to these and other technical problems. For example, the client synchronization service may be configured to monitor changes on the file system of the client device or on the content management system and update the client device and/or content management system as needed. Furthermore, the client synchronization service may be configured to improve performance and reduce processing times by allowing for concurrent execution of operations.

According to some embodiments, planner 225 of client synchronization service 156 shown in FIG. 2 may generate a plan or plan of operations that consists of an unordered set of operations. All operations within a plan have no dependencies and, as a result, are able to be executed concurrently in separate threads or in any order. The operations in the plan, according to some embodiments, are abstract instructions that may be taken by the content management system and/or the client device in order to converge the states and tree data structures. Example instructions may include a remote or local add of a content item, a remote or local delete of a content item, a remote or local edit of a content item, or a remote or local move of a content item.

Scheduler 230 of client synchronization service 156 shown in FIG. 2 may be configured to receive the plan of operations from planner 225, manage the execution of the operations in the plan, determine if the plan has been updated or changed, and manage the execution of the updated or changed plan. For example, scheduler 230 may coordinate with file system interface 205 and server interface 210 to execute the tasks and steps needed to implement operations in the plan. This may include receiving confirmations from the file system or content management system or error handling activities such as handling retries when there is no network connectivity or when a content item is locked by some other application.

Each operation may be implemented by a script or thread referred to as a task. The task coordinates the application of an associated operation and may include one or more steps needed to implement the operation. For example, a "local add operation" may indicate that a content item has been added to the local file system of the client device and, as a result, the content item should be added at the content management system in order to synchronize the server state and the file system state. Accordingly, the local add operation may be associated with a "local add task" that includes one or more steps needed to implement the local add operation. The steps may include one or more of notifying the content management system of the new content item, uploading the content item to the content management system in one or more blocks of data, confirming that all blocks of data have been received by the content management system, making sure the content item is not corrupted, uploading metadata for the content item to the content management system, and committing the adding of the content item to the appropriate location at the content management system.

A task may begin execution, suspend at well-defined points while waiting on the completion of other events, resume when the events have occurred, and eventually terminate. According to some embodiments, scheduler 230 is configured to cancel, regenerate, or replace tasks. For example, based on changes to the server state or the file system state, a task may become stale before it is executed and scheduler 230 may cancel the stale task before it is executed.

As described above, planner 225 may generate a plan of operations based on a set of tree data structures (e.g., a remote tree, a sync tree, and a local tree). Over time, planner 225 continues to generate plans of operations based on the status of the tree data structures. If the tree data structures change to reflect the state of the server state and the file system state, planner 225 may also generate a new updated plan that differs from a previous plan. Scheduler 230 executes each plan of operations generated by the planner 225.

Figure 10:
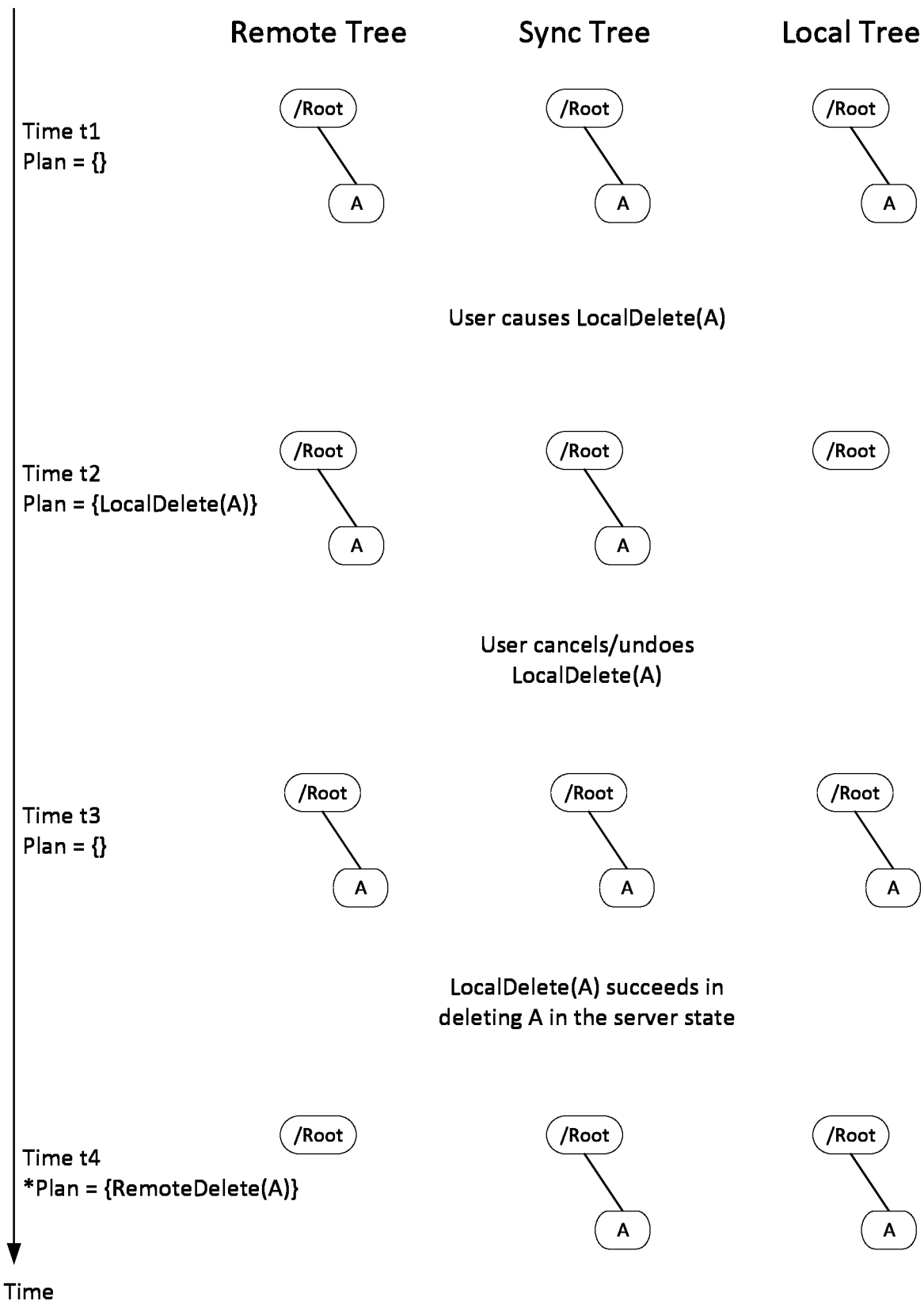
FIG. 10 shows an example scenario.

In some scenarios, changes in the operations of a subsequent plan may cause unintended synchronization behaviors conflicts with an operation in the previous plan that is in the process of execution. For example, as operations in a first plan are being executed, one or more of the operations are canceled (or are not present) in the second plan. To illustrate, FIG. 10 shows an example scenario in which, at time t1, the server state represented by the remote tree and the file system state represented by the local tree are synchronized as shown by the remote tree, the sync tree, and the local tree all matching. Based on this synchronized state, planner 225 may generate a plan with no operations (e.g., an empty plan) at t1 or not generate a plan of operations.

A user on the client device may delete content item A from the local file system or move content item A out of a folder managed by client synchronization service 156, which is reflected by the removal of node A from the local tree at time t2. Planner 225 may generate a plan that includes operation LocalDelete(A) based on the state of the tree data structures at time t2. Scheduler 230 may initiate the task or steps required to implement the LocalDelete(A) operation. These steps may include transmitting instructions to the content management system to delete content item A.

After instructions to delete content item A are transmitted to the content management system, the user on the client device may undo the delete of content item A or move content item A back to the previous location. The local tree is updated based on this new action at time t3 and planner may generate a new plan that is empty with no operations. Once again, the tree data structures match and the system is in a synchronized state at time t3.

However, because instructions to delete content item A were transmitted to the content management system, the content management system deletes content item A from the server state. Although scheduler 230 may attempt to cancel the deletion of content item A, the instructions may have already been transmitted and completed by the content management system. This change in the server is communicated to client synchronization server 156, which updates the remote tree by deleting node A at time t4. Planner 225 could notice the change in the remote tree and the difference between the remote tree and the sync tree and determine that content item A was removed at the server state. Accordingly, planner 225 would create a plan with a RemoteDelete(A) operation at time t4. In an effort to synchronize the server state and the file system state, content item A would eventually be deleted from the client device and the local tree.

Problematically, the removal of content item A from the server state, the generation of the RemoteDelete(A) operation, and the eventual removal of content item A from the file system state are all not intended and may cause further problems down the line for the user. Furthermore, in some cases, applications or processes may also access content items and unintentional synchronization behavior may cause a cascade of additional technical issues. Various embodiments are directed to preventing unintended consequences in synchronization of content items between a server state and a file system state.

According to some embodiments, when canceling a task for a stale operation that is no longer in a plan of operations, scheduler 230 may wait for the cancelation to be completed before proceeding to initiate the execution of other tasks. For example, scheduler 230 may wait to receive confirmation of the cancelation from the client device or the content management system before proceeding with other tasks. Scheduler 230 may determine whether the task has been initiated and if the task has not been initiated, scheduler may cancel the task and confirm that the task is no longer awaiting execution. If the task has been initiated, the confirmation may come from the client device or the content management system and notify the scheduler that all of the steps associated with the canceled task have been undone. According to some implementations, scheduler 230 does not allow for cancelation of a task once it has been initiated. This may be the case for all tasks or a certain subset of tasks or task types (e.g., a commit task that sends an update on the file system state to the content management system for synchronization with the server state).

Figure 11:
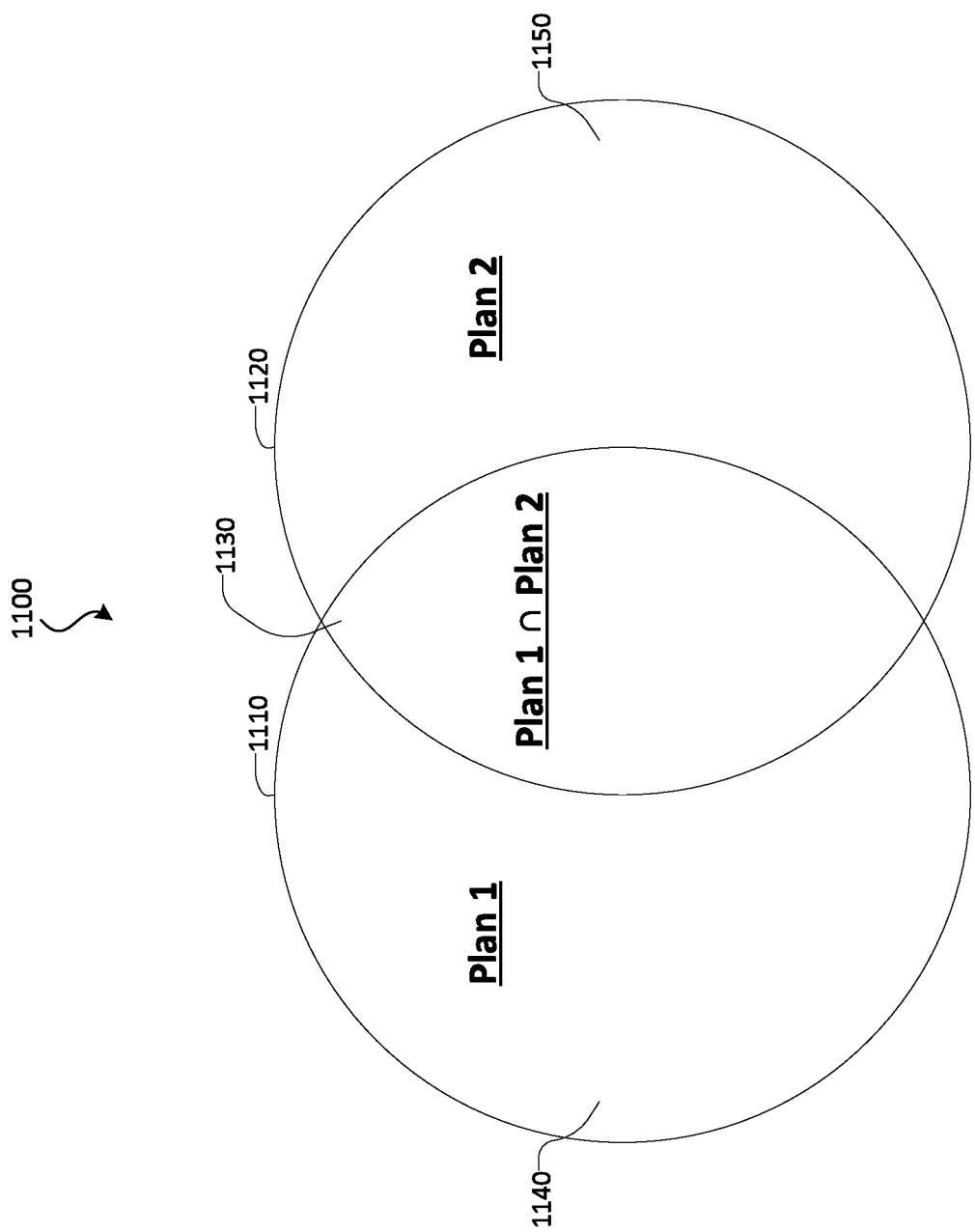
FIG. 11 shows an example Venn diagram representation of two plans of operations, in accordance with various embodiments of the subject technology.

In order to improve performance and allow for concurrent execution of tasks as well as the cancelation of tasks, scheduler 230 may also be configured to manage the execution and cancelation of tasks based on differences between a first plan of operations and an updated second plan of operations. FIG. 11 shows an example Venn diagram 1100 representation of two plans of operations, in accordance with various embodiments of the subject technology. Planner 225 may generate a plan 1 1110 with a first set of operations, receive an update to the tree data structures, and generate an updated plan 2 1120 with a second set of operations.

Plan 1 1110 and plan 2 1120 may share a number of common operations, which is represented by portion 1130 of the Venn diagram 1100. Plan 1 1110 and plan 2 1120 may also share a number of operations that are not in common. For example, operations in plan 1 1110 that are not in plan 2 1120 are stale and no longer current based on the update to the tree structures detected by planner 225. These stale operations of plan 1 1110 are represented by portion 1140 of Venn diagram 1100. New operations in plan 2 1120 that are not in plan 1 1110 are represented by portion 1150. Each of portions 1130, 1140, and 1150 which represent the differences and commonalities between plan 1 1110 and plan 2

1120 may include no operations or many operations depending on the updates to the server state and the file system state that are reflected in the tree data structures.

Because the operations in portion 1140 are no longer in the most recent plan, scheduler 230 may cancel tasks associated with these operations. In order to prevent unintended synchronization behavior, tasks associated with operations in plan 2 that are not in plan 1 (e.g., in portion 1150) are postponed until the cancelation of tasks associated with operation in portion 1140 is completed. However, because operations in each plan are configured to be able to be executed concurrently, tasks associated with operations in the intersection of plan 1 and plan 2 represented by portion 1130 may be executed concurrently with the cancelation of tasks associated with operation in portion 1140 without having to wait for their completion. By allowing for the concurrent cancelation of tasks associated with portion 1140 and the execution of tasks associated with portion 1130, more efficient use of available computing resources may be achieved as well as a reduction in processing time.

Figure 12:
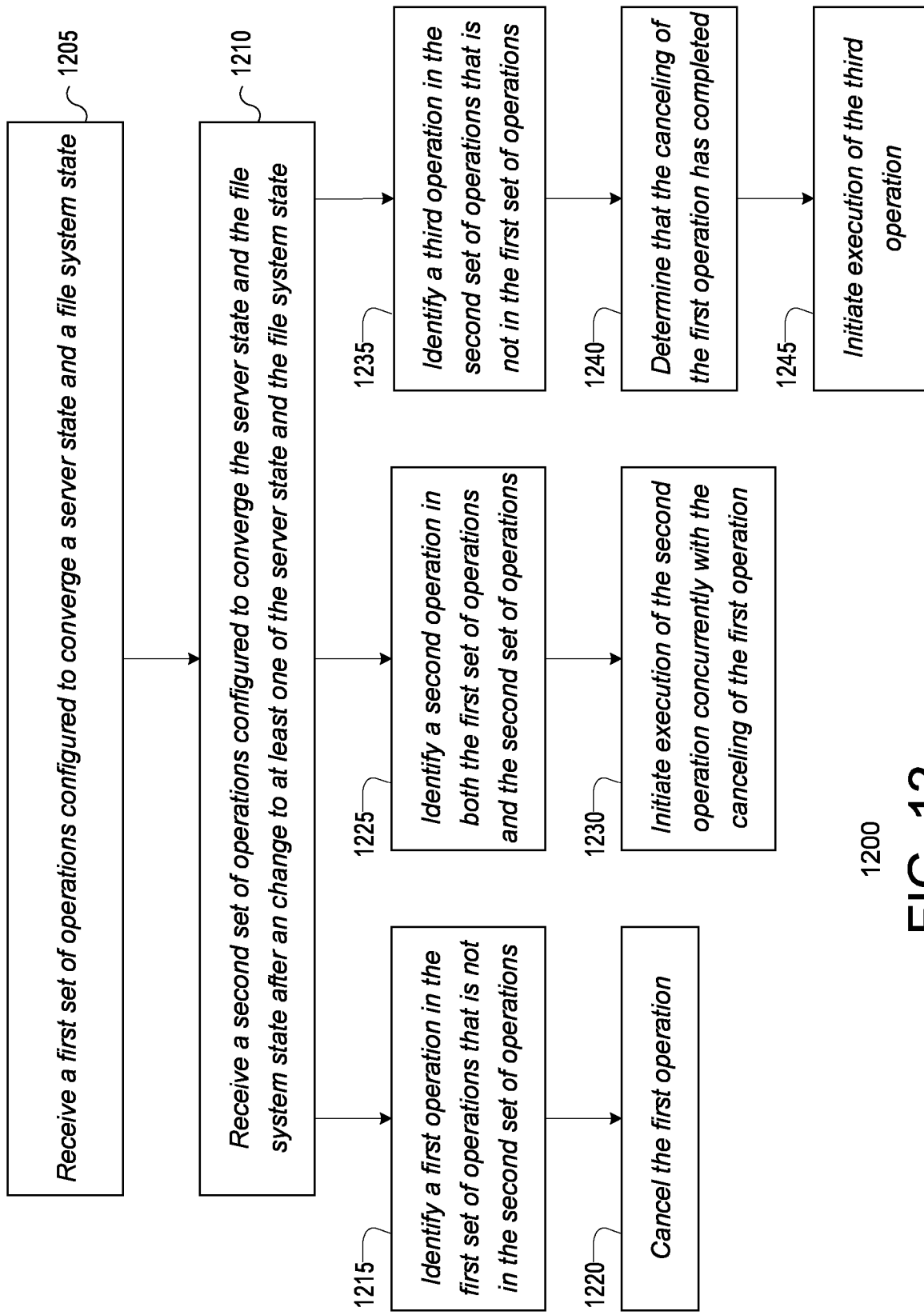
FIG. 12 shows an example method for managing changes in plans of operations, in accordance with various embodiments of the subject technology.

FIG. 12 shows an example method for managing changes in plans of operations, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1200 may be implemented by a system such as, for example, client synchronization service 156 of FIG. 2, running on a client device.

The system may be configured to receive updates from a content management system and/or the client device with regards to content items associated with a content management service. For example the system may receive server modification data for content items stored by a content management service and update, based on the server modification data, a remote tree. The remote tree represents the server state for content items stored by the content management system. The system may also receive client modification data for content items stored on the client device and update, based on the client modification data, a local tree. The local tree represents the file system state for content items stored on the client device.

At operation 1205, the system may receive a first set of operations configured to converge a server state associated with the content management system and a file system state associated with the client device. For example, the system may identify differences between a sync tree and a remote tree or the sync tree and a local tree and generate the first set of operations based on any differences between the trees. The sync tree represents a known synced state between the server state and the file system state.

The system may begin to implement the first set of operations. For example, in some cases, the operations are in a format ready to be transmitted to the content management system and/or the client device for execution. In other cases, the operations may be translated into one or more tasks, scripts, or execution threads that may be managed by the system. The system may interface with the content management system and/or the client device according to the tasks, scripts, or execution threads in order to converge the server state and the file system state.

During this time, the system may continue to receive modification data from a content management system and/or the client device with regards to content items associated with the content management service. Based on the modification data, the system may update the remote tree or local tree and generate a second set of operations based on the updates to the tree data structures. At operation 1210, the system may receive the second set of operations.

At operation 1215, the system identifies a first operation in the first set of operations that is not in the second set of operations, if any. If the system finds an operation in the first set of operations that is not in the second set of operations, this operation may be stale and out of date as a result of changes specified in the modification data. Accordingly, the system will initiate the cancelation of the first operation at operation 1220. The cancelation of the first operation may include a number of steps, a number of confirmation receipts for the steps, and a non-trivial amount of processing time.

At operation 1225, the system identifies a second operation that is included in both the first set of operations and the second set of operations, if any. If the system finds an operation in both the first set of operations and the second set of operations, this operation may be still be valid notwithstanding changes specified in the modification data. Furthermore, since the operations in both sets of operations are configured to be able to be executed concurrently or in any order with respect to other operations in the set, the second operation can continue execution while the first operation is canceled. Accordingly, the system will initiate the execution of the second operation at operation 1230 without waiting for the first operation to complete cancelation.

At operation 1235, the system identifies a third operation that is in the second set of operations, but not in the first set of operations, if any. If the system finds an operation in the second set of operations that is not in the first set of operations, this operation may be a new operation as a result of changes specified in the modification data. In order to prevent unintended consequences, the system will initiate a wait for the completion of the cancelation of the first operation. At operation 1240, the system may determine that the first operation has completed cancelation and, as a result, initiate the execution of the third operation at operation 1245.

Debugging a Client Synchronization Service

As illustrated above, the synchronization processes performed by the client synchronization service are complex and configured to handle a wide variety of scenarios. More specifically, given any initial state for the set of trees (e.g., the local tree, the sync tree, and the remote tree), the client synchronization service is configured to perform various operations that eventually converge the trees until a final synchronized state is reached. However, it is difficult to determine if all components and modules of the client synchronization service are designed and implemented entirely without errors or bugs. It is also difficult to determine, out of the limitless possibilities, whether there are certain situations where the client synchronization service may not function as intended or, in other words, whether there exists an initial state in which the client synchronization service produces a final state that is not synchronized or is not correctly synchronized. Unfortunately, for many errors, it is prohibitively difficult to debug the client synchronization service without being able to identify scenarios in which the client synchronization service does not function as intended and be able to recreate the situations and scenarios in which the client synchronization service does not function as intended.

Various embodiments of the subject technology are directed to a debugging system for efficiently generating various scenarios, testing the scenarios with the client synchronization service, and identifying particular scenarios that are problematic. These identified scenarios may then be provided to a quality assurance system or engineer for debugging and reconfiguration of the client synchronization service. Over time, the debugging system may identify bugs in the client synchronization service that are corrected, thus leading to a more robust and error free client synchronization service.

Figure 13:
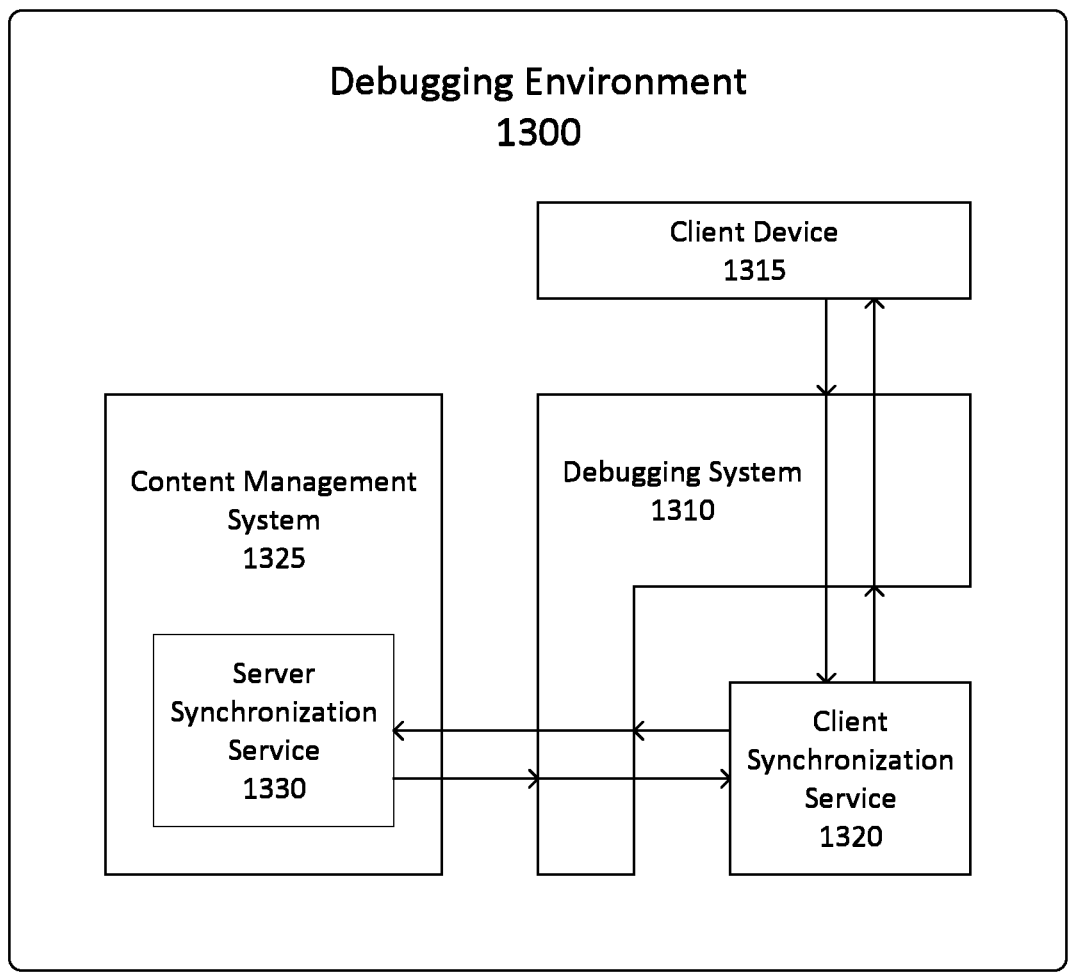
FIG. 13 shows an example of a debugging environment, in accordance with some embodiments.

FIG. 13 shows a conceptual example of a debugging environment 1300, in accordance with some embodiments. Debugging environment 1300 may include debugging system 1310, client device 1315, client synchronization service 1320, content management system 1325, and server synchronization service 1330. Debugging environment 1300 may be implemented on one or more computing devices (e.g., servers) and include one or more instances of debugging system 1310, client device 1315, client synchronization service 1320, content management system 1325, and server synchronization service 1330. According to some embodiments, one or more of the components of debugging environment 1300 may be virtualized in modules, containers, or virtual machines and/or communications between the components in debugging environment 1300 may be simulated.

Client synchronization service 1320 may be implemented as a version of the code designed for inclusion in client application software for operation on a client device (e.g., client device 150 in FIG. 1). Client synchronization service 1320 is configured to synchronize content items stored on client device 1315 and content management system 1325.

Client device 1315 may simulate an actual client device on which client synchronization service 1320 is configured to operate on. According to various embodiments, the content items stored on client device 1315 may be simulated for ease of implementation and testing. In fact, client device 1315 may itself be simulated by debugging system 1310.

Content management system 1325 may simulate an actual content management system (e.g., content management system 110 of FIG. 1) running server synchronization service 1330. Content management system 1325 and server synchronization service 1330 may be configured to interact with client synchronization service 1320 in order to synchronize content items stored on client device 1315 and content management system 1325. According to various embodiments, the content items stored on content management system 1325 may also be simulated for ease of implementation and testing. Furthermore, content management system 1325 and server synchronization service 1330 may also be simulated by debugging system 1310.

Debugging system 1310 is configured to initialize client device 1315, content management system 1325, and/or client synchronization service 1320 for testing. Initialization of the components of debugging environment 1300 may include generating an initial local file system state, an initial server file system state, and/or an initial tree state and implement these initial states on the client device 1315, content management system 1325, and/or client synchronization service 1320. In order to reduce the computing resource requirements consumed during certain testing procedures, the local file system state and the server file system state (and changes to these states) may be simulated.

Debugging system 1310 is further configured to manage the testing of the synchronization processes and monitor the operation of the other components in debugging environment 1300. In some cases, debugging system 1310 may also introduce various anomalies into the synchronization processes to further test the robustness of client synchronization service 1320.

Once the synchronization processes are completed or stopped, debugging system 1310 may test the outcome to determine whether the actual outcome of the synchronization processes match the expected outcome. Various checks may be performed to determine whether an actual outcome is consistent with an expected outcome of the synchronization processes. The actual outcome being consistent with the expected outcome indicates that the client synchronization service 1320 is operating as intended. However, if the actual outcome is not consistent with the expected outcome, debugging system 1310 may flag the scenario and store a record of the scenario for future analysis by a quality assurance system or engineer.

Testing Tree Synchronization Processes

As noted above, client synchronization service 1320 may represent content items stored on client device 1315 or local file system state in a local tree. The content items stored on content management system 1325 or the server state may be represented in a remote tree. Client synchronization service 1320 may also maintain a sync tree that represents a merge base for the local tree and the remote tree.

In order to properly synchronize the content items stored on of client device 1315 and content management system 1325, client synchronization service should be able to take any initial tree state for the local tree, the remote tree, and the sync tree, generate a set of operations, execute those operations, and eventually reach a final tree state where the local tree, the remote tree, and the sync tree are synchronized. However, this may not necessarily be the case for all of the infinite possible initial tree states. For example, there may be situations where the processes described above (e.g., with respect to FIG. 5, 6, 8, or 12) were implemented in a way that causes an unintended outcome for a specific initial tree state. Various embodiments of the subject technology are directed toward addressing the difficulties in identifying problematic initial tree states so that bugs in client synchronization service 1320 may be corrected. In particular, debugging system 1310 may be configured to try to identify initial tree states where client synchronization service 1320 may not operate as intended.

Figure 14:
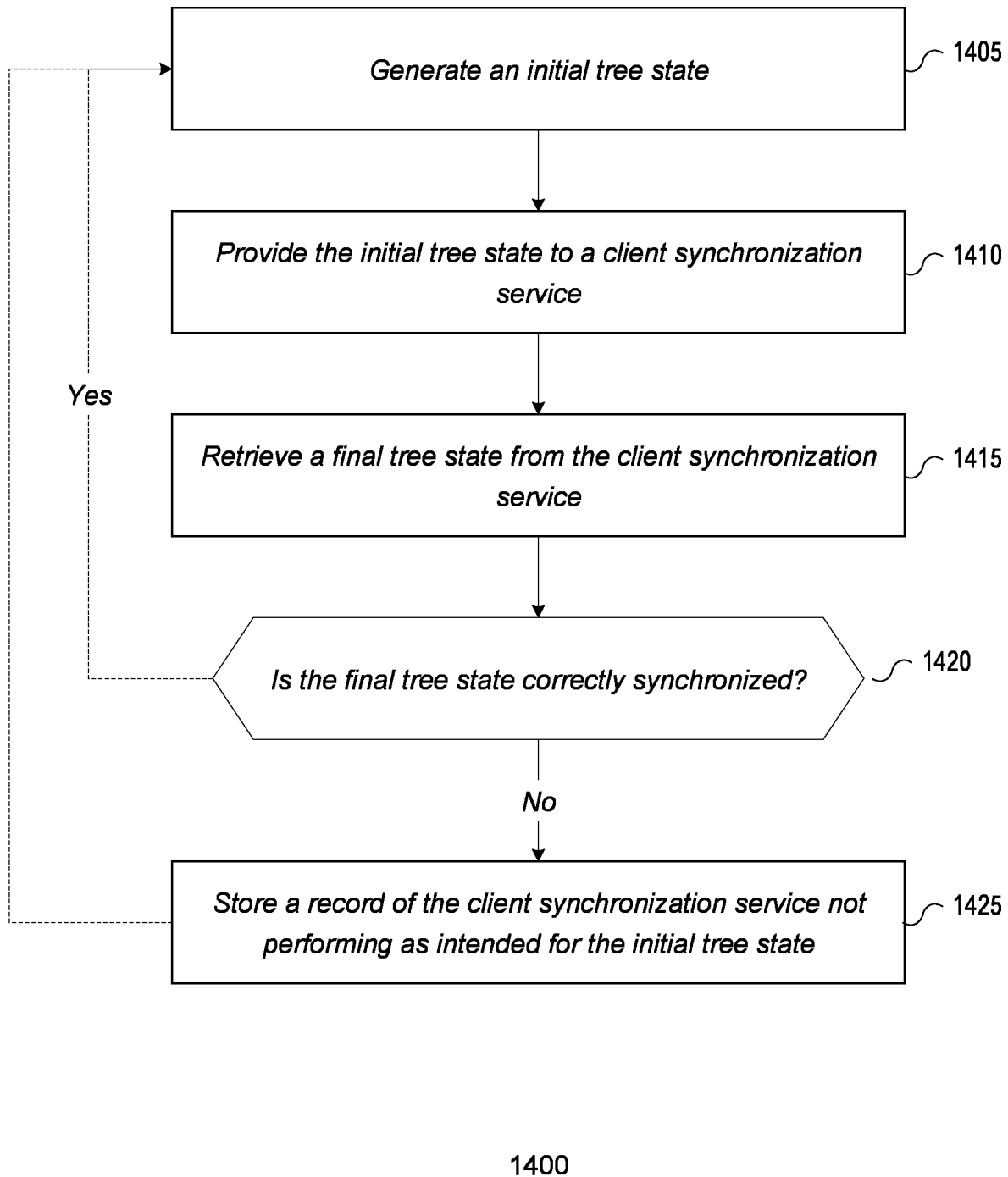
FIG. 14 shows an example method for determining whether a client synchronization service is operating as intended given an initial tree state, in accordance with various embodiments of the subject technology.

FIG. 14 shows an example method for determining whether a client synchronization service is operating as intended given an initial tree state, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1400 may be implemented by a system such as, for example, debugging system 1310 of FIG. 13.

At operation 1405, debugging system 1310 may generate an initial tree state for the local tree, the remote tree, and the sync tree. Debugging system 1310 may leverage the use of a pseudorandom number generator or deterministic random bit generator and a seed value to generate the initial tree state. Based on a given seed value, the pseudorandom number generator is configured to output a sequence of numbers that may appear to be random. However, given the same seed value, the pseudorandom number generator is configured to output the same sequence of numbers. This quality aids debugging system 1310 in efficient identification, storage, and management of initial tree states where client synchronization service 1320 may not operate as intended.

Debugging system 1310 may select a seed value and generate the initial tree state using the pseudorandom number generator and the seed value. Various facets of the generation of the initial tree state may be dependent on the sequence of number generated by the pseudorandom number generator. For example, debugging system 1310 may use a debugging script or debugging sequence of operations where the operations may take as input one or more of the numbers in the sequence of numbers generated by the pseudorandom number generator. The operations may include, for example, the creation of a number of nodes for a tree, where the number of nodes created is based on a formula that uses a next number in the sequence of numbers as input. The structure of the tree or the location of each node within the tree may also be based on a next number in the sequence. The name and/or file identifier associated with the each node may further be generated based on a next number in the sequence.

According to some embodiments, a sync tree may be generated based on the sequence of numbers generated by the pseudorandom number generator and the seed value before the local tree and the remote tree are generated. Debugging system 1310 may then generate the local tree and the remote tree based on the generated sync tree by applying changes to the sync tree. These changes may also be randomly selected and implemented based on the sequence of numbers generated by the pseudorandom number generator and the seed value. For example, to generate the local tree, debugging system 1310 may copy the previously generated sync tree and run another script or sequence of operations that mutates the sync tree. This mutated tree is then used as the local tree.

These operations may also take as input one or more of the numbers in the sequence of numbers generated by the pseudorandom number generator. For example, the operations may include randomly selecting a number of nodes based on a next number or set of numbers in the sequence and randomly applying a change to the selected node or number of nodes based on a next number or set of numbers in the sequence. The changes may include, for example, the addition of a node, the deletion of a node, a move of a node, a rename of a node, an edit of a node, or any other change that is tracked by client synchronization service 1320. The remote tree may similarly be generated based on the sync tree, another sequence of operations, and the sequence of numbers generated by the pseudorandom number generator and the seed value.

After the initial tree state is generated, debugging system 1310 may initialize client synchronization service 1320 by providing the initial tree state to client synchronization service 1320 at operation 1410. As discussed throughout, client synchronization service 1320 is configured to take the initial tree state and converge the trees through a series of operations.

During the synchronization processes, the client synchronization service 1320 may identify differences between a server state represented by the remote tree and a sync tree and/or differences between a file system state represented by the local tree and the sync tree, generate a set of operations based on the identified differences, and provide the set of operations to content management service 1325 or client device 1315. Client synchronization service 1320 may also receive modification data for content items stored by content management service 1325 or on client device 1315 and update the remote tree and/or the local tree based on the modification data. In some implementations this process may be iterative and/or incremental.

According to some embodiments, the focus of debugging system 1310 in process 1400 is to test the synchronization of the local tree, the remote tree, and the sync tree by the client synchronization service 1320. Accordingly, to increase testing speed and operation efficiency as well as reduce the use of computing resources, operations of other entities in debugging environment 1300 may be simulated. For example, the updating of the server state on content management service 1325 and the updating of the file system state on client device 1315 as well as the modification data transmitted to the client synchronization service 1320 from content management service 1325 or client device 1315 may be simulated by debugging system 1310, content management service 1325, or client device 1315 in debugging environment 1300.

According to some embodiments, the operations generated by client synchronization service 1320 are an unordered set of operations where all operations within the unordered set have no dependencies and, as a result, are able to be executed concurrently in separate threads or in any order. Debugging system 1310 tests these properties by randomly reordering or permuting the set of operations generated by client synchronization service 1320 and determining whether client synchronization service 1320 is still able to properly synchronize the local tree, the remote tree, and the sync tree as expected. Whether or not to permute the set of operations, when to permute the set of operations, and how to permute the set of operations may also be based on the sequence of numbers generated by the pseudorandom number generator and the seed value.

Client synchronization service 1320 may cease operation once client synchronization service 1320 detects that the local tree, the remote tree, and the sync tree are synchronized and no other synchronization operations are needed. Alternatively, client synchronization service 1320 may cease operations if a problem or bug is encountered. Even if the client synchronization service 1320 detects that the trees are synchronized, they may not in fact be synchronized. Accordingly, debugging system 1310 determines that client synchronization service 1320 has ceased operation and, at operation 1415, retrieves a final tree state from client synchronization service 1320. The final tree state includes the local tree, the remote tree, and the sync tree after client synchronization service 1320 has completed attempting to synchronize the initial tree state.

At operation 1420, debugging system 1310 determines whether the final tree state is correctly synchronized. In determining whether the final tree state is correctly synchronized, debugging system 1310 may perform a number of tests on the final tree state that ensure that the characteristics of a correctly synchronized tree state are present in the final tree state received from client synchronization service 1320. For example, debugging system 1310 may check that all three trees of the final tree state are identical, that all nodes in the initial local tree are in all three trees of the final tree state, and that all nodes in the initial remote tree are in all three trees of the final tree state.

If the final tree state is correctly synchronized, client synchronization service 1320 is performing as expected with respect to the initial tree state. Accordingly debugging system may store a record of the client synchronization service 1320 passing the test for the initial tree state. In some embodiments, however, only records of initial states that do not pass are recorded. Debugging system 1310 may then return to operation 1405 to continue to test additional initial tree states.

If the final tree state is not correctly synchronized, client synchronization service 1320 did not perform as intended with respect to the initial tree state. Accordingly, at operation

1425, debugging system may store a record of the client synchronization service 1320 not performing as intended for the initial tree state for debugging. The record may store a representation of the initial tree state (e.g., the tree state, a reduced tree state, or the seed value used to generate the initial tree state) and the test results that indicate that client synchronization service 1320 did not perform as intended with respect to the initial tree state. Debugging system 1310 may then return to operation 1405 to continue to test additional initial tree states.

As noted above, debugging system 1310 may generate the initial tree state based on a sequence of numbers generated by the pseudorandom number generator based on a given seed value and given the same seed value, the pseudorandom number generator is configured to output the same sequence of numbers. Furthermore, debugging system 1310 uses a deterministic script or set of testing operations that executes in order. For example, all or certain tasks performed by debugging system 1310 may be executed in a single-threaded execution mode.

Accordingly, to store a record of the client synchronization service 1320 not performing as intended for the initial tree state, debugging system 1310 may simply store the seed value used to generate the initial tree state. A quality assurance system or engineer may be able to recreate the initial tree state and/or all other testing parameters used by debugging system 1310 using the seed value. Accordingly, the memory requirements needed to store a records may be greatly reduced. The bandwidth, processing, and other computing resources needed for transmission and processing of the records may similarly be reduced. Furthermore, by functioning in a deterministic manner, the results and order of results identified by debugging system 1310 may be reproducible in a consistent and reliable manner, which aids in the debugging process.

Reducing the Tree States for Debugging

In some cases, the tree states (e.g., the initial tree state and/or the final tree state) produced by debugging system 1310 may be quite large and the conditions that caused client synchronization service 1320 to not perform as intended may occur in a small portion of the initial tree state. Having a large initial tree state may increase the computing resources needed for a quality assurance system to debug client synchronization service 1320. For engineers, a large initial tree state may distract, confuse, or otherwise frustrate efforts to quickly identify the conditions that caused client synchronization service 1320 to misbehave. According to various embodiments, debugging system 1310 may be configured to reduce a problematic tree state by removing portions that do not cause the unintended performance in client synchronization service 1320.

Figure 15:
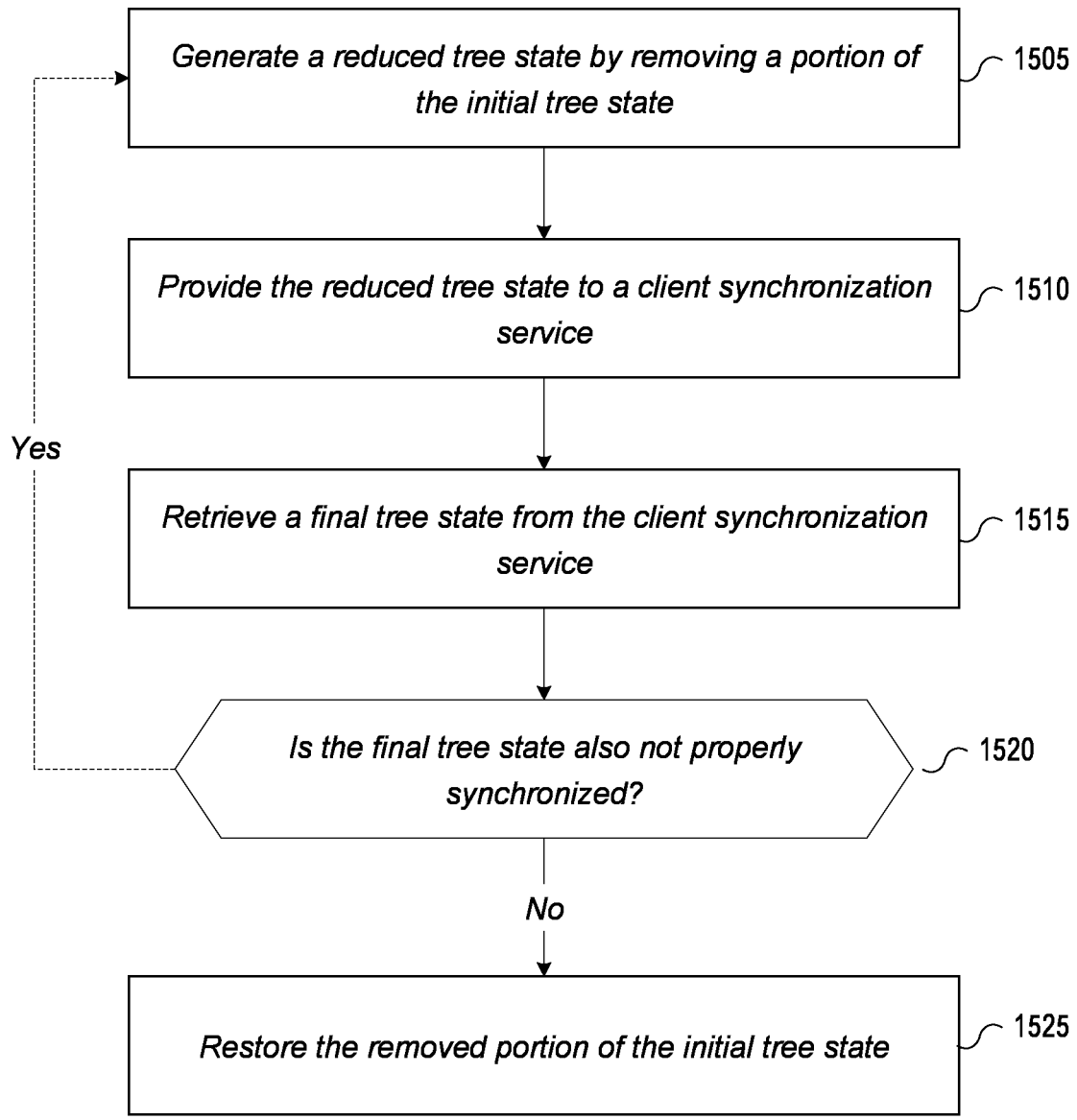
FIG. 15 shows an example method for reducing an initial tree state, in accordance with various embodiments of the subject technology.

FIG. 15 shows an example method for reducing an initial tree state, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1500 may be implemented by a system such as, for example, debugging system 1310 of FIG. 13.

After an initial tree state that client synchronization service 1320 does not correctly synchronize is identified, debugging system 1310 may generate a reduced tree state by removing a portion of the initial tree state at operation 1505. For example, debugging system 1310 may randomly remove one or more nodes from the initial tree state. The node to be removed may be determined based on the sequence of numbers generated by the pseudorandom number generator based on the seed value that generated the initial tree state.

At operation 1510, debugging system 1310 may provide client synchronization service 1320 with the reduced tree state to rerun the synchronization process. When client synchronization service 1320 has completed operation, debugging system 1310 may retrieve the final tree state at operation 1515 and determine whether the final tree state is correctly synchronized at operation 1520. In determining whether the final tree state is correctly synchronized, debugging system 1310 may perform the same tests that were performed to initially determine that client synchronization service 1320 does not correctly synchronize the initial tree state. According to some embodiments, debugging system 1310 may check whether the same tests that were violated for the initial tree state remain violated for the reduced tree state.

If the final tree state is properly synchronized, the portion of the initial tree state that causes the unintended performance in client synchronization service 1320 is likely to have been removed at operation 1505. Accordingly, the removed portion of the initial tree state may be restored at operation 1525.

If the final tree state is also not properly synchronized, the portion of the initial tree state that causes the unintended performance in client synchronization service 1320 is likely to still be in the reduced tree state. Accordingly, debugging system 1310 may return to operation 1505 to remove further portions of the initial tree state in order to generate a further reduced tree state. This process may continue until the final tree state is properly synchronized, indicating that the portion of the initial tree state that causes the unintended performance in client synchronization service 1320 is likely to have been removed. Accordingly, the removed portion of the initial tree state may be restored at operation 1525. The reduced initial tree state may be provided to a quality assurance system or engineer or stored for later processing.

Testing Client Synchronization Service Processes

In addition to testing the tree synchronization processes of client synchronization service 1320, debugging system 1310 may also (or alternatively) be configured to test client synchronization service 1320 at a higher level. Client synchronization service 1320 is designed to operate in a complex environment and perform complex tasks along with a number of other entities (e.g., the content management system, the client device running the client application associated with client synchronization service 1320, as well as other client devices allowed to access content items that client synchronization service 1320 is allowed to access). These other entities may operate more or less independently and yet may affect the synchronization processes performed by client synchronization service 1320. This introduces a number of "real-world" circumstances that may cause bugs or errors in the operation of client synchronization service 1320.

These circumstances may include, for example, race conditions where multiple updates (from the client device, the content management system, or other client devices) to one or more content items occur within the same time period before synchronization of the one or more content items can be completed. Crashes, unplanned shut downs, or restarts of the client device, the client application associated with client synchronization service 1320, or the content management system may also be a source of problems for client synchronization service 1320. Other circumstances that may cause bugs include network issues, the content management system updating content items in a conflicting manner, receiving responses from the client device or content management system in different orders, etc. A goal of a robust client synchronization service 1320 is to be able to handle all these circumstances without degrading synchronization efforts.

Various embodiments of the subject technology are directed toward identifying problematic conditions that cause bugs in client synchronization service 1320 so that the bugs may be addressed. In particular, debugging system 1310 may be configured to generate initial file states for client synchronization service 1320 to operate on, introduce various anomalies into the synchronization process, and determine whether client synchronization service 1320 was able to correctly complete the synchronization process. If client synchronization service 1320 is unable to correctly complete the synchronization process, the initial file state in combination with the anomalies introduced by debugging system 1310 likely surfaced a bug in client synchronization service 1320. Accordingly, a record of the initial file state and anomalies may be stored and/or provided to a quality assurance system or engineer for debugging of client synchronization service 1320.

Figure 16:
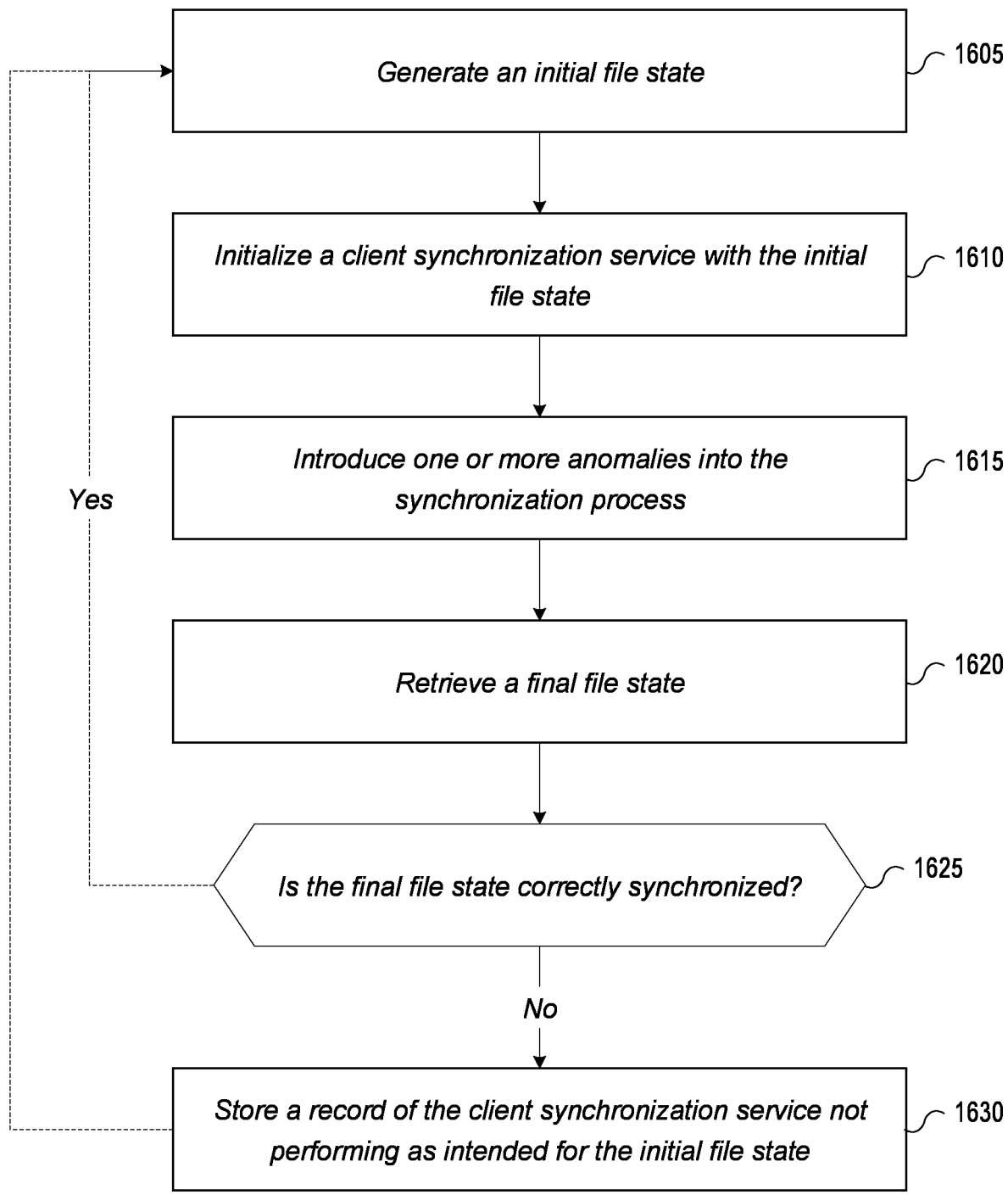
FIG. 16 shows an example method for determining whether a client synchronization service is operating as intended given an initial file state, in accordance with various embodiments of the subject technology.

FIG. 16 shows an example method for determining whether a client synchronization service is operating as intended given an initial file state, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 1600 may be implemented by a system such as, for example, debugging system 1310 of FIG. 13.

At operation 1605, debugging system 1310 may generate an initial file state for testing. The initial file state may include an initial local file system state and an initial server file system state. The local file system state (otherwise referred to as the file system state) may include information relating to the state of the content items stored locally on the client device. The server file system state (also referred to as the server state) may include information relating to the state of corresponding content items stored remotely from the client device (e.g., on a server of the content management system and managed by the content management system). The information may include, for example, content item identifiers, contents or representations of the content items, metadata associated with the content items, or other information associated with the content items.

Debugging system 1310 may leverage the use of a pseudorandom number generator or deterministic random bit generator and a seed value to generate the initial tree state. Based on a given seed value, the pseudorandom number generator is configured to output a sequence of numbers that may appear to be random. Furthermore, given the same seed value, the pseudorandom number generator is configured to output the same sequence of numbers. This quality aids debugging system 1310 in efficient identification, storage, and management of initial file states where client synchronization service 1320 may not operate as intended.

Debugging system 1310 may select a seed value and generate the initial file state using the pseudorandom number generator and the seed value. Various facets of the generation of the initial file state may be dependent on the sequence of numbers generated by the pseudorandom number generator. Debugging system 1310 may use a debugging script or debugging sequence of operations where the operations may take as input one or more of the numbers in the sequence of numbers generated by the pseudorandom number generator. In some embodiments, each of the operations in the debugging script may take one or more of the numbers in the sequence as input and subsequent operations may take subsequent numbers in the sequence as input.

The operations may include, for example, the creation of a number of content items for the initial local file system state and the location (e.g., the paths) for each content item in the local file system, the creation of a number of content items for the initial server file system state and the location for each content item in the server file system, generating a file name for each content item, generating content or a representation of the content for each content item, or other data (e.g., metadata) associated with the content items. Each operation may take as input one or more of the numbers in the sequence generated by the pseudorandom number generator based on the seed value such that the initial file state is generated randomly or near randomly.

According to some embodiments, the initial local file system state may be generated first and the initial server file system state may be generated based on the initial local file system state, or vice versa. For example, debugging system may generate the initial file system state as discussed above and then, to create the initial server file system state by applying changes to the initial file system state. These changes may also be randomly selected and implemented based on the sequence of numbers generated by the pseudorandom number generator and the seed value. For example, to generate the initial server file system state, debugging system 1310 may copy the previously generated initial local file system state and run another script or sequence of operations that mutates the local file system state. This mutated local file system state is then used as the initial server file system state.

These operations may also take as input one or more of the numbers in the sequence of numbers generated by the pseudorandom number generator. For example, the operations may include randomly selecting a content item based on a next number or set of numbers in the sequence and randomly applying a change to the selected content item based on a next number or set of numbers in the sequence. The changes may include, for example, the addition of a content item, the deletion of a content item, a move of a content item, a rename of a content item, an edit of a content item, or any other change that is tracked by client synchronization service 1320.

After the initial file state is generated, debugging system 1310 may initialize client synchronization service 1320 with the initial file state at operation 1610. The initial file state may be initially passed to client synchronization service 1320 or client synchronization service 1320 may request the information contained in the initial file state upon initialization. For example, when client synchronization service 1320 starts up, client synchronization service 1320 may request local file system information from the client device and server file system information from the content management system. This information, which is in the initial file state, may be provided to client synchronization service 1320 by debugging system 1310 either directly by simulating the client device and the content management system in the debugging environment 1300 or by relaying the information from content management system 1325 and/or client device 1315 in debugging environment 1300.

Once the information in the initial file state is obtained, client synchronization service 1320 is configured to perform a synchronization process on the content items specified in the initial file state. More specifically, as discussed in greater detail throughout, client synchronization service 1320 may generate a set of tree data structures (e.g., the remote tree, the local tree, and the sync tree) based on the initial file state and synchronize the content items specified in the initial file state based on the tree data structures. During the synchronization process, the client synchronization service 1320 may identify differences between the tree data structures, generate a set of operations based on the identified differences, and provide the set of operations to content management service 1325 or client device 1315.

The operations provided to client device 1315 may be in the form of file input/output (I/O) requests or system requests that instruct a client application or client device 1315 to perform operations that converge the local file system state and the server file system state. The operations provided to content management service 1325 may be in the form of network requests that instruct content management service 1325 to perform operations that converge the server file system state with the local file system state. According to some embodiments, after the set of operations are provided to content management service 1325 or client device 1315, client synchronization service 1320 may be required to wait for a response before continuing to the next iteration of incremental synchronization steps that converge the server file system state with the local file system state. As such, client synchronization service 1320 may become "blocked" until modification data confirming that the requested operations were executed is received from content management service 1325 or client device 1315.

The modification data may specify what changes occurred or operations were performed with respect to one or more content items associated with the initial file state. Modification data received from content management system 1325 may be referred to as server modification data. Server modification data specifies the changes are done to one or more content items by content management system 1325 and may be used to update the remote tree. Modification data received from client device 1315 may be referred to as client modification data. Client modification data specifies the changes are done to one or more content items on client device 1315 and may be used to update the local tree.

At operation 1615, debugging system 1310 may detect that client synchronization service 1320 is blocked or waiting for an event (e.g., a response or modification data from content management service 1325 or client device 1315) and use the opportunity to introduce one or more anomalies into the synchronization process. A blocked or waiting state may be detected based on intercepted input/output (I/O) requests or system requests sent to client device 1315 or intercepted network requests sent to content management service 1325.

The anomalies that debugging system 1310 may introduce may include, for example randomly simulating a crash or restart of the client application associated with client synchronization service 1320 and/or client device 1315, randomly changing the local file system state and/or the server file system state during the synchronization process, randomly satisfying of confirming file I/O requests or system requests by client device 1315, randomly satisfying of confirming network requests by content management service 1325, or satisfying or confirming the requests in a random order.

Each entity involved in the synchronization process may misbehave or introduce conditions that are not ideal for client synchronization service 1320. One goal is to identify conditions that may cause client synchronization service 1320 to incorrectly synchronize content items so that client synchronization service 1320 may be debugged in order to better handle the identified conditions. Debugging system 1310 introduces the anomalies in order to simulate certain real world situations where several entities are concurrently and independently operating. For example, debugging system 1310 may introduce network request timeouts that may simulate a network problem, a problem with the network interface of client device 1315, or an issue with content management service 1325. Random crashes or restarts of the client application or client device 1315 also do occur from time to time for various reasons (e.g., in response to user action, operating system processes, application processes, hardware issues, etc.). Debugging system 1310 attempts to test client synchronization service 1320 reaction to these events and the ability to correctly synchronize the file states in spite of these occurrences.

Debugging system 1310 may further attempt to simulate situations where client synchronization service 1320 may send out multiple requests to client device 1315 or content management service 1325, which are processed independently and responses to those requests may come back in different orders or with errors. Alternatively, content items stored on client device 1315 or on content management service 1325 may be changed or updated again in the middle of a synchronization process. Debugging system 1310 may attempt to simulate this situation by randomly mutating content items in the local file system state and/or the server file system state.

Various aspects of the introduction of anomalies into the synchronization process may also be based on the sequence of numbers generated by the pseudorandom number generator and the seed value. For example, one or more operations in the debugging script used by debugging system 1310 may be responsible for determining whether an anomaly is introduced, how many anomalies are introduced, what type of anomaly is introduced, the parameters of the anomaly (e.g., which content item is to be changed or updated, which request will be responded to), and when the anomaly is introduced. These operations in the debugging script may take as input one or more of the numbers in the sequence of numbers generated by the pseudorandom number generator.

During the incremental synchronization process where client synchronization service 1320 converges the local file system state and the server file system state, debugging system 1310 may have multiple opportunities to introduce anomalies, depending on the debugging script. For example, during the incremental synchronization process, client synchronization service 1320 generates a plan of operations that incrementally converges the local file system state and the server file system state. Once the operations are transmitted to client device 1315 or content management service 1325, client synchronization service 1320 may become blocked. Debugging system 1310 may introduce anomalies at this point based on the debugging script and the sequence of numbers generated by the pseudorandom number generator. Once client synchronization service 1320 receives responses from client device 1315 or content management service 1325 (e.g., modification data), client synchronization service 1320 may update the tree data structures and generate a new plan of operations. The process continues incrementally until the local file system state and the server file system state are synchronized. Alternatively, client synchronization service 1320 may cease operations if a problem or bug is encountered. Furthermore, even if the client synchronization service 1320 detects that the trees are synchronized, they may not in fact be synchronized.

Accordingly, debugging system 1310 may determine that client synchronization service 1320 has ceased operation and, at operation 1620, retrieve a final file state. The final file state includes the local file system state and server file system state once client synchronization service operations have ceased and may be retrieved from client device 1315 and content management service 1325. Alternatively, debugging system 1310 may maintain a record of the local file system state and server file system state. Debugging system 1310 may also retrieve the tree data structures (e.g., the local tree, the remote tree, and the sync tree) from client synchronization service 1320.

At operation 1625, debugging system 1310 determines whether the final file state is correctly synchronized. In determining whether the final file state is correctly synchronized, debugging system 1310 may perform a number of tests on the final file state that ensure that the characteristics of a correctly synchronized file state are present in the final file state received from client synchronization service 1320. For example, debugging system 1310 may check that the final local file system state and the final server file system state are identical, that all content items in the initial local file system state are in the final local file system state and the final server file system state, and that all content items in the initial server file system state the final local file system state and the final server file system state. Debugging system 1310 may further check that the final local file system state is accurately represented by the local tree and the final server file system state is accurately represented by the remote tree.

In some cases, some of the introduced anomalies such as changes to the local file system state or the server file system state during the synchronization process may change the expected outcome of the synchronization process. Accordingly, when comparing the file states, any changes to the file states that occurred during the synchronization process may be accounted for.

If the final file state is correctly synchronized, client synchronization service 1320 is performing as expected with respect to the initial file state. Accordingly debugging system may store a record of the client synchronization service 1320 passing the test for the initial file state. In some embodiments, however, only records of initial states that do not pass are recorded. Debugging system 1310 may then return to operation 1605 to continue to test additional initial file states.

If the final file state is not correctly synchronized, client synchronization service 1320 did not perform as intended with respect to the initial file state. Accordingly, at operation 1630, debugging system may store a record of the client synchronization service 1320 not performing as intended for the initial file state for debugging. The record may store a representation of the initial file state (e.g., the file state, a reduced file state, or the seed value used to generate the initial file state) and the tests results that indicate that client synchronization service 1320 did not perform as intended with respect to the initial file state. Debugging system 1310 may then return to operation 1605 to continue to test additional initial file states.

As noted above, debugging system 1310 may generate the initial file state based on a sequence of numbers generated by the pseudorandom number generator based on a given seed value and given the same seed value, the pseudorandom number generator is configured to output the same sequence of numbers. Furthermore, debugging system 1310 uses a script or set of testing operations that executes in a deterministic manner. For example, all or certain tasks performed by debugging system 1310 may be executed in a single-threaded execution mode.

Accordingly, to store a record of the client synchronization service 1320 not performing as intended for the initial file state, debugging system 1310 may simply store the seed value used to generate the initial file state. A quality assurance system or engineer may be able to recreate the initial file state, the anomalies introduced and the order in which they were introduced, and/or all other testing parameters used by debugging system 1310 using the seed value. Accordingly, the memory requirements needed to store a records may be greatly reduced. The bandwidth, processing, and other computing resources needed for transmission and processing of the records may similarly be reduced. Furthermore, by functioning in a deterministic manner, the results and order of results identified by debugging system 1310 may be reproducible in a consistent and reliable manner, which aids in the debugging process.

Figure 17:
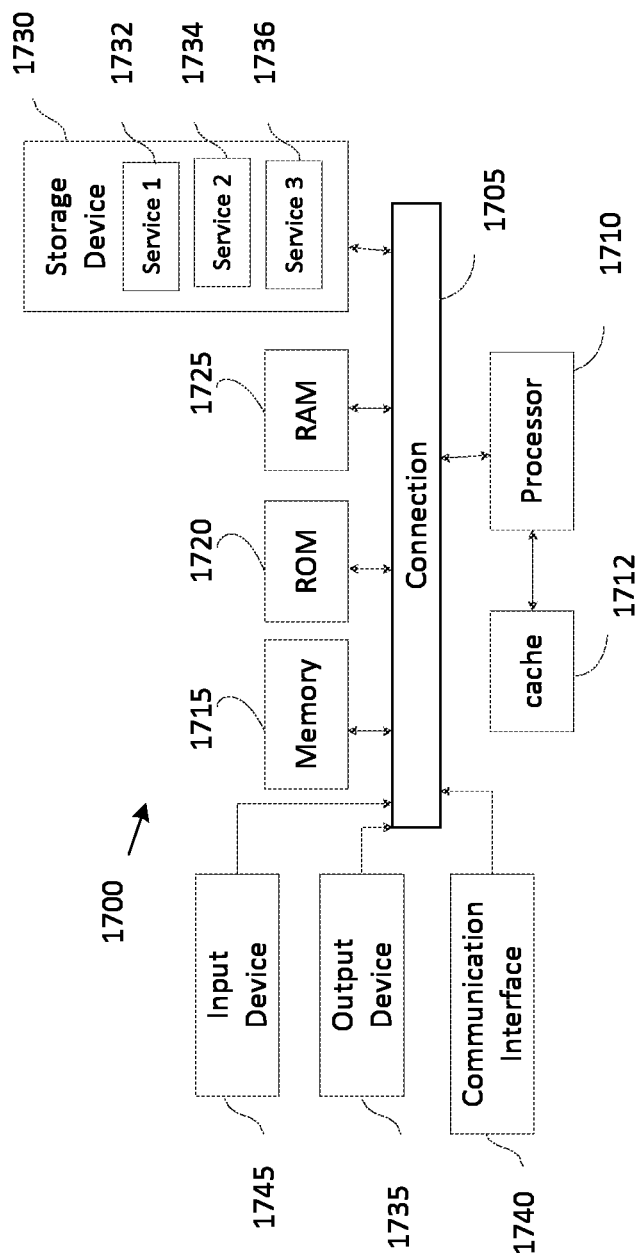
FIG. 17 shows an example of a system for implementing certain aspects of the present technology.

FIG. 17 shows an example of computing system 1700, which can be for example any computing device making up client device 150, content management system 110 or any component thereof in which the components of the system are in communication with each other using connection 1705. Connection 1705 can be a physical connection via a bus, or a direct connection into processor 1710, such as in a chipset architecture. Connection 1705 can also be a virtual connection, networked connection, or logical connection.

In some embodiments computing system 1700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1700 includes at least one processing unit (CPU or processor) 1710 and connection 1705 that couples various system components including system memory 1715, such as read only memory (ROM) 1720 and random access memory (RAM) 1725 to processor 1710. Computing system 1700 can include a cache of high-speed memory 1712 connected directly with, in close proximity to, or integrated as part of processor 1710.

Processor 1710 can include any general purpose processor and a hardware service or software service, such as services 1732, 1734, and 1736 stored in storage device 1730, configured to control processor 1710 as well as a special-purpose processor where software instructions are incorporated into the actual processor design. Processor 1710 may essentially be a completely self-contained computing system, containing multiple cores or processors, a bus, memory controller, cache, etc. A multi-core processor may be symmetric or asymmetric.

To enable user interaction, computing system 1700 includes an input device 1745, which can represent any number of input mechanisms, such as a microphone for speech, a touch-sensitive screen for gesture or graphical input, keyboard, mouse, motion input, speech, etc. Computing system 1700 can also include output device 1735, which can be one or more of a number of output mechanisms known to those of skill in the art. In some instances, multimodal systems can enable a user to provide multiple types of input/output to communicate with computing system 1700. Computing system 1700 can include communications interface 1740, which can generally govern and manage the user input and system output. There is no restriction on operating on any particular hardware arrangement and therefore the basic features here may easily be substituted for improved hardware or firmware arrangements as they are developed.

Storage device 1730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1730 can include software services, servers, services, etc., that when the code that defines such software is executed by the processor 1710, it causes the system to perform a function. In some embodiments, a hardware service that performs a particular function can include the software component stored in a computer-readable medium in connection with the necessary hardware components, such as processor 1710, connection 1705, output device 1735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware, and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
generating an initial tree state, wherein the initial tree state includes an initial sync tree, an initial local tree, and an initial remote tree, and wherein the initial sync tree represents a known synced state between a server state and a file system state, the initial remote tree represents the server state, and the initial local tree represents the file system state;
providing the initial tree state to a client synchronization service; retrieving a final tree state from the client synchronization service; determining whether the final tree state is correctly synchronized; and
storing, when the final tree state is not correctly synchronized, the initial tree state for debugging the client synchronization service.

2. The computer-implemented method of claim 1, wherein storing the initial tree state comprises storing a seed value associated with the initial tree state.

3. The computer-implemented method of claim 1, further comprising:
selecting a seed value;
generating a sequence of numbers by inputting the seed value into a pseudorandom number generator; and
wherein generating the initial tree state comprises executing a set of tree generation operations based on the sequence of numbers.

4. The computer-implemented method of claim 1, wherein generating the initial tree state comprises:
generating the initial sync tree;
generating the initial local tree by applying a first set of changes to the initial sync tree; and
generating the initial remote tree by applying a second set of changes to the initial sync tree.

5. The computer-implemented method of claim 4, wherein the initial sync tree, the first set of changes, and the second set of changes are based on a sequence of numbers by inputting a seed value into a pseudorandom number generator.

6. The computer-implemented method of claim 1, further comprising permuting a set of operations generated by the client synchronization service.

7. The computer-implemented method of claim 1, wherein the final tree state comprises a final local tree, a final sync tree, and a final remote tree, and wherein determining whether the final tree state is correctly synchronized comprises determining that the final local tree, the final sync tree, and the final remote tree are identical.

8. The computer-implemented method of claim 1, wherein the final tree state comprises a final local tree, a final sync tree, and a final remote tree, and wherein determining whether the final tree state is correctly synchronized comprises:
   determining that all nodes in the initial local tree have corresponding nodes in the final local tree, the final sync tree, and the final remote tree; and
   determining that all nodes in the initial remote tree have corresponding nodes in the final local tree, the final sync tree, and the final remote tree.

9. The computer-implemented method of claim 1, further comprising simulating synchronization processes for a client device or a content management service.

10. The computer-implemented method of claim 1, further comprising:
   generating a reduced initial tree state by removing a portion of the initial tree state;
   providing the reduced initial tree state to the client synchronization service; retrieving a reduced final tree state from the client synchronization service; determining whether the reduced final tree state is correctly synchronized; and
   restoring the portion of the initial tree state based on a determination that the reduced final tree state is correctly synchronized.

11. The computer-implemented method of claim 10, further comprising:
   reducing, based on a determination that the reduced final tree state is not correctly synchronized, the reduced initial tree state by removing a portion of the reduced initial tree state.

12. A non-transitory computer-readable medium comprising instructions, the instructions, when executed by a computing system, cause the computing system to:
   identify an initial tree state that a client synchronization service does not correctly synchronize;
   generate a reduced initial tree state by removing a portion of the initial tree state; provide the reduced initial tree state to the client synchronization service;
   retrieve a final tree state from the client synchronization service; determine whether the final tree state is correctly synchronized; and
   restore the portion of the initial tree state based on a determination that the final tree state is correctly synchronized.

13. The non-transitory computer-readable medium of claim 12, wherein the instructions, when executed by the computing system, further cause the computing system to:
   reduce, based on a determination that the final tree state is not correctly synchronized, the reduced initial tree state by removing a portion of the reduced initial tree state;
   provide the reduced initial tree state to the client synchronization service; retrieve the final tree state from the client synchronization service; and determine whether the final tree state is correctly synchronized.

14. The non-transitory computer-readable medium of claim 12, wherein the portion of the initial tree state is selected based on a sequence of numbers generated by inputting a seed value into a pseudorandom number generator.

15. A system comprising:
   a processor; and
   a non-transitory computer-readable medium storing instructions that, when executed by the processor, cause the processor to:
      generate an initial tree state, wherein the initial tree state includes three tree data structures configured to aid in synchronization of content items managed by a content management system;
provide the initial tree state to a client synchronization service;
   retrieve a final tree state from the client synchronization service; determine that the final tree state is incorrectly synchronized; and
   provide, based on the final tree state being incorrectly synchronized, the initial tree state to a quality assurance entity.

16. The system of claim 15, wherein the instructions, when executed by the processor, further cause the processor to:
   select a seed value;
   generate a sequence of numbers by inputting the seed value into a pseudorandom number generator; and
      wherein initial tree state is generated based on the sequence of numbers.

17. The system of claim 15, wherein the instructions, when executed by the processor, further cause the processor to store a seed value associated with the initial tree state.

18. The system of claim 15, wherein the three tree data structures comprise a sync tree representing a known synced state between a server state and a file system state, a local tree representing the file system state, and a remote tree representing the server state.

19. The system of claim 18, wherein the instructions, when executed by the processor, further cause the processor to:
   generating the sync tree;
   generating the local tree by applying a first set of changes to the sync tree; and
   generating the remote tree by applying a second set of changes to the sync tree.

20. The system of claim 15, wherein the final tree state comprises a final local tree, a final sync tree, and a final remote tree, and wherein the instructions, when executed by the processor, further cause the processor to determining that the final local tree, the final sync tree, and the final remote tree are identical.

* * * * *